PATRICK R. J. COURT GEORGE BROWNSTEIN
ABRAHAM M. REITER PHIL H. WEISS
*INVENTORS.*

BY Lyon & Lyon

ATTORNEYS.

PATRICK R. J. COURT GEORGE BROWNSTEIN
ABRAHAM M. REITER PHIL H. WEISS
*INVENTORS.*

BY Lyon & Lyon
ATTORNEYS.

May 18, 1965 P. R. J. COURT ETAL 3,184,537

SUBSCRIPTION-TELEVISION SYSTEM EMPLOYING SUPPRESSION OF SYNCHRONIZING SIGNALS

Filed Oct. 4, 1960

10 Sheets-Sheet 3

PATRICK R. J. COURT GEORGE BROWNSTEIN
ABRAHAM M. REITER PHIL H. WEISS
*INVENTORS.*

BY Lyon & Lyon

ATTORNEYS.

PATRICK R. J. COURT GEORGE BROWNSTEIN
ABRAHAM M. REITER PHIL H. WEISS
*INVENTORS.*

BY Lyon & Lyon
ATTORNEYS.

PATRICK R. J. COURT GEORGE BROWNSTEIN
ABRAHAM M. REITER PHIL H. WEISS
*INVENTORS.*

BY Lyon & Lyon
ATTORNEYS.

May 18, 1965

P. R. J. COURT ETAL

SUBSCRIPTION-TELEVISION SYSTEM EMPLOYING SUPPRESSION OF SYNCHRONIZING SIGNALS 3,184,537

Filed Oct. 4, 1960

10 Sheets-Sheet 6

PATRICK R. J. COURT GEORGE BROWNSTEIN
ABRAHAM M. REITER PHIL H. WEISS
INVENTORS.

BY Lyon & Lyon

ATTORNEYS.

May 18, 1965 P. R. J. COURT ETAL 3,184,537

SUBSCRIPTION-TELEVISION SYSTEM EMPLOYING SUPPRESSION OF SYNCHRONIZING SIGNALS

Filed Oct. 4, 1960 10 Sheets-Sheet 7

PATRICK R. J. COURT GEORGE BROWNSTEIN
ABRAHAM M. REITER PHIL H. WEISS
INVENTORS.

BY Lyon & Lyon

ATTORNEYS.

PATRICK R. J. COURT GEORGE BROWNSTEIN
ABRAHAM M. REITER PHIL H. WEISS
*INVENTORS.*

BY Lyon & Lyon

ATTORNEYS

PATRICK R. J. COURT GEORGE BROWNSTEIN
ABRAHAM M. REITER PHIL H. WEISS
*INVENTORS.*

BY Lyon & Lyon
ATTORNEYS.

PATRICK R. J. COURT GEORGE BROWNSTEIN
ABRAHAM M. REITER PHIL H. WEISS
INVENTORS.

BY Lyon & Lyon
ATTORNEYS.

3,184,537

SUBSCRIPTION-TELEVISION SYSTEM EMPLOYING SUPPRESSION OF SYNCHRONIZING SIGNALS

Patrick R. J. Court, Los Angeles, George Brownstein, Pacoima, Los Angeles, Abraham M. Reiter, Reseda, Los Angeles, and Phil H. Weiss, Panorama City, Los Angeles, Calif., assignors to Paramount Pictures Corporation, New York, N.Y., a corporation of New York Filed Oct. 4, 1960, Ser. No. 60,410
28 Claims. (Cl. 178—5.1)

This invention relates to subscription-television systems and, more particularly, to improvements therein.

It has become necessary for properly carrying out the functions of subscription television to transmit a greater amount of information to a subscriber receiver than is transmitted in the course of a nonsubcription-television broadcast. A considerable amount of ingenuity is required to convey the increased information, in the case of the subscription-television broadcast, because of the restrictions on bandwidth which are imposed by the Federal Communications Commission. The transmitted information must comprise not only the program video and program sound signals, but also other audio signals which are hereinafter referred to as "barker" signals. These barker signals give information about the program and are transmitted usually just prior to the commencement of the program and during the pendency of the program.

Since it is necessary to withhold the program from a subscriber until he signifies that he intends to incur the financial obligation required to pay for the program, then some arrangement is usually made at the transmitter for rendering the program video or audio or both unintelligible to a subscriber until he has either paid for the program or demonstrated his willingness to pay therefor. This entails sending information to subscriber receivers whereby they may intelligibly reproduce the withheld program video and audio signals.

It is desirable to let a subscriber know what the program cost is. To that end, signals are transmitted, indicating the cost of the program. Finally, for accounting purposes, it is most desirable to transmit information identifying a program, which information can be recorded at a receiver when the purchase of the program is consummated. These identification signals must also be transmitted.

Experience has shown that the most desirable subscription-television system is one wherein any person who has a television set and wishes to become a subscriber can do so by the simple expedient of having an attachment which connects only to the antenna terminals of the receiver. Such attachment must be ingenious enough to process all information received and pass to the subscriber's receiver only such signals as the receiver can handle. Any subscription-television system which involves any tampering or rewiring of the circuits of the receiver not only requires a cumbersome and expensive installation, but also effectively places the subscription-television company under an obligation to repair any malfunctions of the television receiver, regardless of the cause of such malfunction. There is also some potential danger to the subscriber if the installation is incorrectly or inexpertly made, particularly in the case of a "hot chassis" A.C./D.C. type of television receiver.

An object of this invention is to provide a novel subscription-television transmission system.

Another object of this invention is to provide a novel subscription-televsion receiver attachment.

Yet another object of this invention is to provide an improved video scrambling and unscrambling arrangement.

Yet another object of this invention is the provision of an improved system for transmitting and recovering program audio and barker audio information.

Still another object of this invention is the provision of an improved arrangement at a subscription-television receiver for processing the signals transmitted at that receiver.

These and other objects of the invention may be achieved in a subscription-television system wherein at a transmitter program video signals are modulated on the video carrier without vertical or horizontal synchronizing signals and with the horizontal and vertical blanking signals being reduced so that the value of the modulation is constant at grey level. The usual sound carrier in the television transmission is frequency-modulated with barker audio signals. In addition, the carrier for barker audio is amplitude-modulated with sync-insertion control signals which preferably are composite synchronizing signals. Control signals which include pricing pulses, program-identity code pulses, and tone bursts are modulated on a control subcarrier and on a "phantom" subcarrier. The barker audio carrier is amplitude-modulated in the intervals between the sync pulses, either with the modulated control subcarrier or the phantom subcarrier. The program audio carrier is FM-modulated with program audio. The carrier has its frequency preferably selected to lie on the vestigial sideband side of the video carrier.

A receiver attachment connects between the antenna of the receiver and the antenna input terminals. This attachment is designed to operate with any commercially available television receiver, either monochrome or color. The receiver attachment includes circuits so that, when tuned to a subscription-television broadcast, it conveys to the receiver antenna terminals video signals with the sync signals removed, while modulated on the video carrier, and barker signals, while modulated on its carrier. The receiver will not intelligibly reproduce the video signals, in view of the lack of the sync signals. The receiver, however, will reproduce the barker audio signals which, as previously indicated, are modulated on the usual audio carrier employed in the normal commercial transmission. The receiver attachment also includes circuits for removing the subcarrier on which the control signals are amplitude-modulated, and for demodulating the control signals from the subcarrier. The price of the program is then indicated.

If the subscriber wishes to purchase the program, he may pay for it in cash, or signify his willingness to incur the financial obligation. A recording of the program-identification code signals is then made. In addition, circuits are provided which transpose the program audio carrier from its position at the vestigial sideband portion of the video carrier to the position occupied in the normal program transmission which is the identical position presently occupied by the barker audio signals. The barker audio signals are attenuated in a manner so that when both barker audio and program audio are fed to the receiver an FM-capture effect arises, whereby the program audio carrier effectively suppresses the barker audio carrier, and only the program audio is reproduced by the receiver.

Means are also provided in the receiver attachment for removing the composite sync signals from the barker audio carrier and for using these signals for inserting composite sync signals in the video signals while they are still modulated on the carrier. The receiver will then reproduce the video signals in the normal manner, so that the subscriber may now enjoy his program.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a drawing illustrating carrier-frequency placement employed in an embodiment of this invention;

FIGURES 2A, 2B, and 2C are drawings shown for illustrating the waveforms which occur in performing a suppressing function to achieve grey sync, and thereafter an augmenting function to restore the sync signals, which are shown to assist in an understanding of this invention;

FIGURE 3 comprises a series of waveforms illustrating what can occur at a receiver during the vertical synchronizing and blanking interval when the augmenting function which is at a horizontal sync signal frequency deviates from an optimum value;

FIGURE 4 comprises a series of waveforms illustrating what occurs at a receiver during the vertical synchronizing and blanking interval when the augmenting function, which is derived from signals having the frequency of composite sync signals, deviates from an optimum value;

Figure 1:
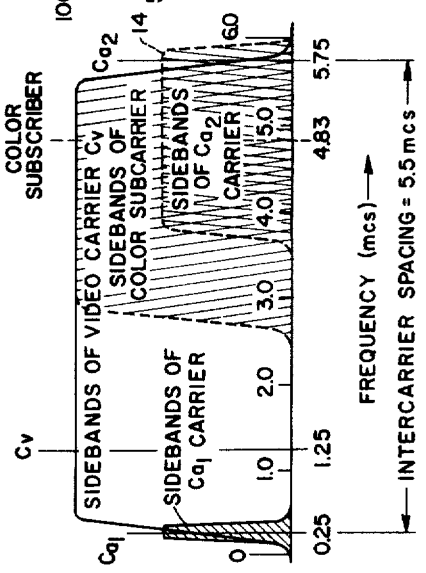

Reference is now made to FIGURE 1, which is a drawing illustrating the carrier placing employed in the embodiment of this invention. Within the six megacycles allotted for a television broadcast, the video carrier $C_v$ is selected to occupy its normal position at 1.25 megacycles from the lower band-end of the channel. The program audio carrier $C_{a1}$ is centered at 0.25 megacycle from the lower band-end of the allotted six-megacycle channel. The barker audio carrier $C_{a2}$ is centered at 5.75 megacycles from the lower band-end of the allotted six-megacycle channel, which is the location presently allotted for the program audio carrier. The curve 10 illustrates the total bandwidth occupied by the video carrier and its sidebands. The curve 12 illustrates the total bandwidth occupied by the modulated program audio carrier, and the curve 14 illustrates the total bandwidth occupied by the barker audio carrier when it has been modulated with barker audio, composite sync signals, and control-signal subcarrier.

The program audio carrier is frequency-modulated plus or minus 25 kilocycles. Aside from the location of the program audio carrier, the program audio is handled identically in every respect in the same manner as program audio is handled in a commercial broadcast.

The video carrier is approximately 85 percent amplitude-modulated, in a negative sense, with "composite grey-sync" video. The negative sense of modulation means that the minimum carrier corresponds to peak white. The use of "grey-sync" video is first described and claimed in a patent to Phil Weiss, Patent No. 2,907,816. As will be subsequently described herein, the grey-sync system employed in this invention is an improvement over that described in the patent.

Figures 2A, 2B, 2C:
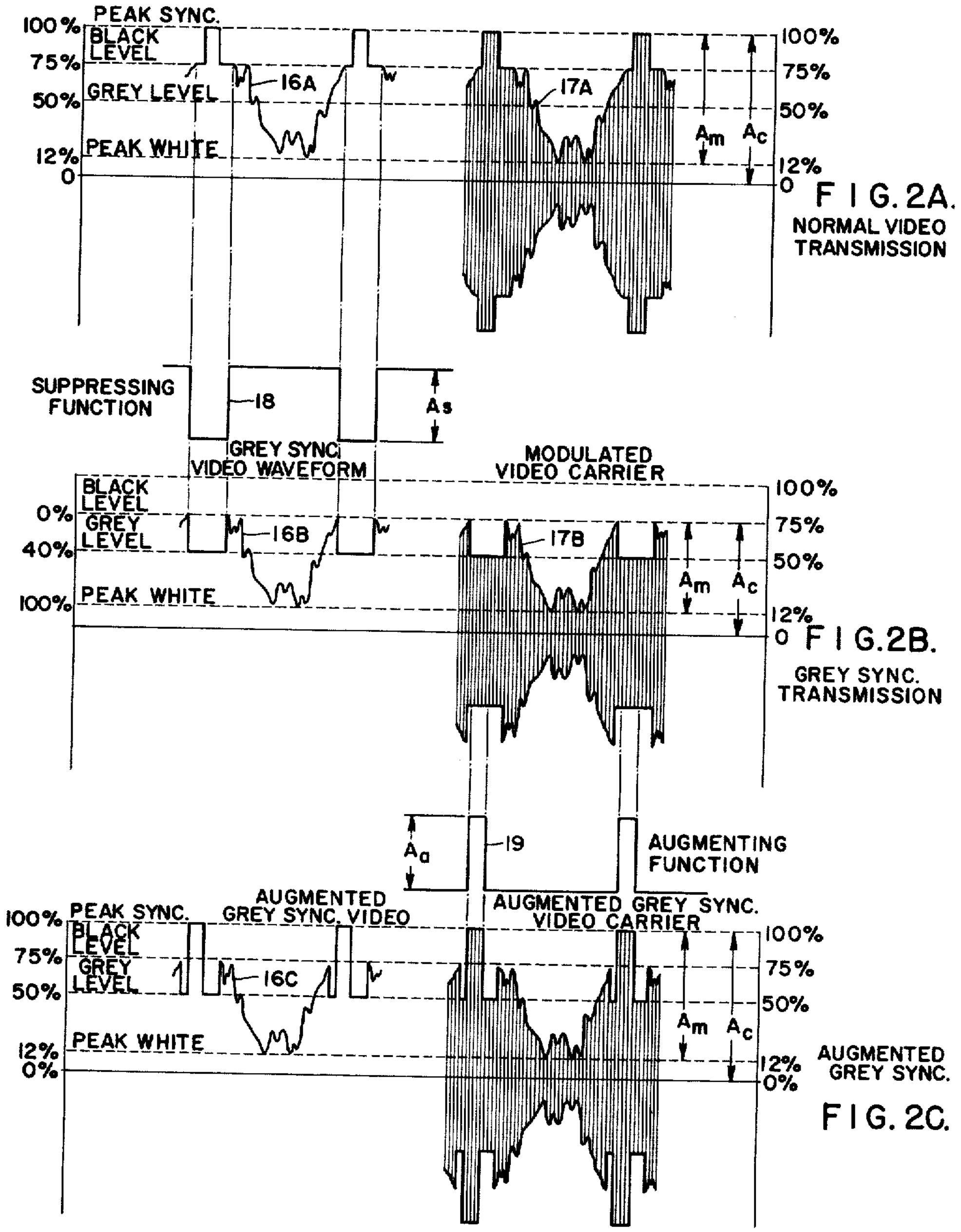

Referring now to FIGURE 2A, there may be seen a representation of a portion of the normal video waveform 16A, in which there are included the horizontal sync signals which are on pedestals which are provided by the horizontal blanking signals. The curve 17A shows the appearance of the video signal when modulated on a carrier. As is well known, the horizontal blanking signals are at the black level, which is approximately the 75 percent video-carrier excursion level, whereas the grey level is defined as approximately 50 percent of the video-carrier excursion from the tip of the horizontal sync to carrier zero.

FIGURE 2B shows the grey-sync video waveform 16B, which is derived from the waveform 16A by "suppressing" the sync and blanking signals to the grey level. Pulses, such as represented by the waveform 18, may be employed for clamping or suppressing the sync and blanking signals to the desired grey level. The appearance of the grey-sync video signal modulated on the carrier appears as represented by 17B. The grey-level signal corresponds to a level which is approximately 40 percent of the video excursion from black to peak white (as peak white is actually 12 percent of the carrier).

FIGURE 2C shows the waveforms achieved by the sync-reinsertion or augmenting function. The sync-reinsertion signal 19 is employed to augment the video carrier within the region of grey sync. This results in a waveform as shown at 17C. When demodulated, the video signal 16C is obtained. The sync-reinsertion function occurs in the receiver attachment during the synchronizing intervals when the carrier level is increased by a factor of two, to thereby go from grey level (50 percent carrier) to the normal sync level (100 percent carrier). When the augmenting function is optimum, the restored sync has an amplitude relative to the picture amplitude which is the same as the original waveform in FIGURE 2A.

In the patent to Phil Weiss, previously mentioned, and in an application to Phil Weiss et al., Serial No. 742,114, filed June 16, 1958, now U.S. Patent No. 3,001,011, assigned to a common assignee, there is described and claimed arrangements for employing the technique of transmitting grey sync to a receiver. The receiver is unable to utilize this signal until after the payment or indication of willingness to pay for the subscription-television program, signals are applied to circuitry in the receiver attachment which serves the purpose of augmenting the video signal while modulated on the carrier in a manner so that synchronizing signals are restored in the composite video while modulated on the carrier and the receiver can thereafter intelligibly reproduce the video signals. In the systems employed for deriving a grey-sync video signal, a suppression function of the horizontal sync signals was performed at the transmitter. Accordingly, at the receiver attachment, an augmenting function was performed for restoring sync.

FIGURES 2A through 2C illustrate grey sync during horizontal blanking and synchronizing intervals using a suppressing function at the horizontal frequency and an augmenting function at the horizontal frequency. During the vertical and synchronizing interval, however, the situation is more complicated.

Figure 3:
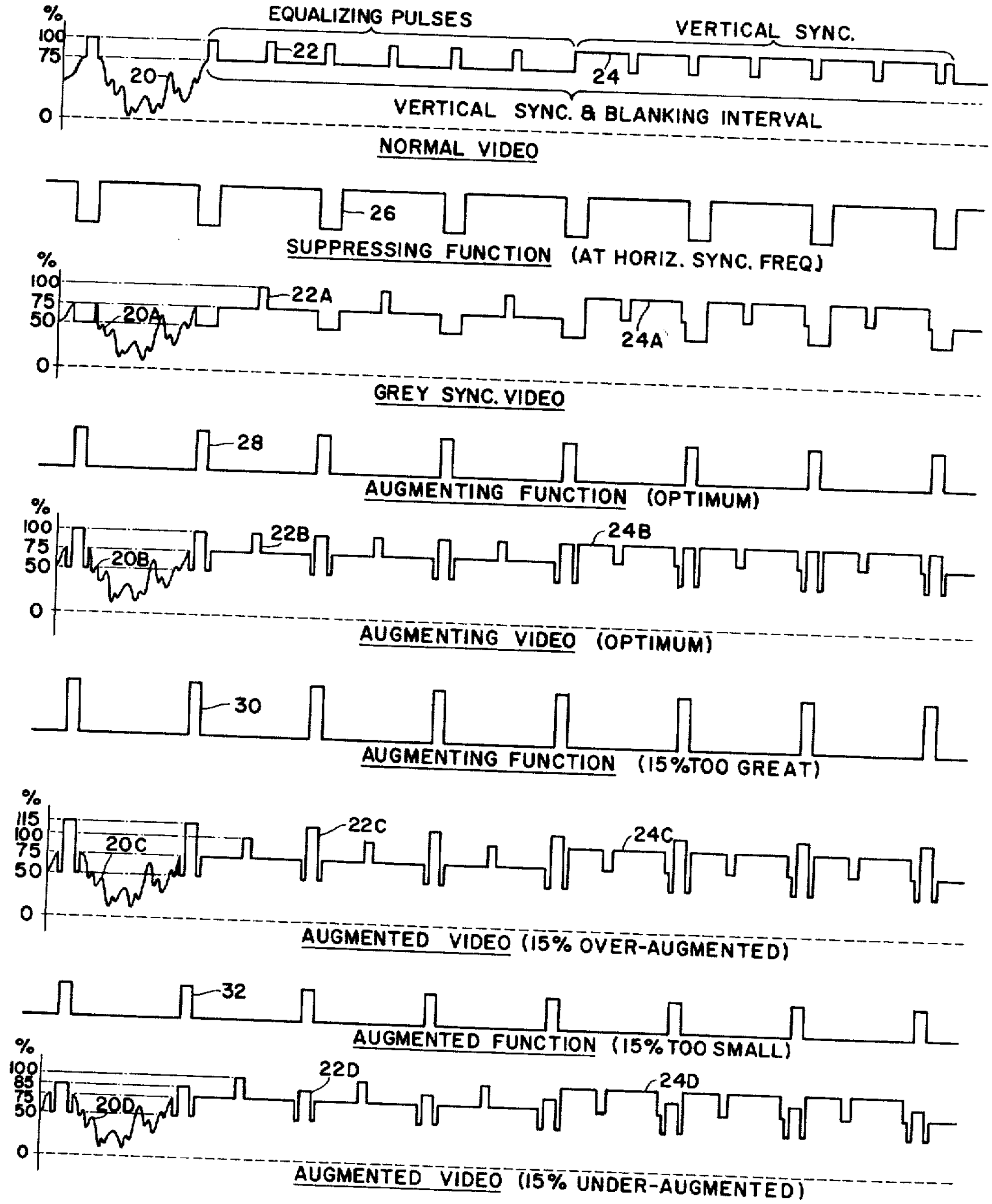

FIGURE 3 is a series of waveforms illustrating what can occur at a receiver during the vertical synchronizing and blanking interval when an improper augmenting function occurs at the horizontal frequency. The first waveform represents the waveform of a normal video signal 20 with equalizing pulses 22 and vertical sync pulses 24, which occur during the vertical sync and blanking interval. In accordance with the teachings of the previously mentioned patent, the suppressing function is carried out with a pulse train 26 occurring at the horizontal frequency. The amplitude of the suppressing pulses may be represented by $A_s$.

The grey-sync waveform resulting from the suppression function includes the visual portion 20A of the video signal, some equalizing pulses 22A, since not all are reduced to grey level by the horizontal frequency-suppressing signal 26, and the vertical sync pulses 24A, which are notched as shown by the suppressing signal 26. This is the signal which is modulated on a carrier and transmitted.

At a receiver, an augmenting signal 28 is generated, which is at the horizontal frequency and which has an amplitude equal to $A_a$ which, when optimum, is equal to $A_s$. The video signal obtained by the augmenting operation is shown, and corresponding portions to the normal video signal bear reference numerals 20B, 22B, and 24B. An examination of this augmented waveform shows that, even though the augmenting function is of optimum amplitude, every-other equalizing pulse 22B is of nonstandard width. Moreover, every-other serration of the vertical sync pulses is of nonstandard form. During the odd fields, an even field being shown here, the position of the alternate standard and nonstandard interlace pulses, and standard and nonstandard serrations, is reversed. These timing discrepancies can cause receivers of marginal design to have faulty interlace or pairing of the lines of the reproduced picture.

A pulse wave train 30 represents an augmenting signal which is larger than the optimum signal by approximately 15 percent. The resulting augmented video signal has portions bearing reference numerals 20C, 22C, 24C, corresponding to portions 20, 22, 24 in the original video signal. Here the augmented signal rises above the nonaugmented components of the vertical sync and blanking intervals, including the major parts of the vertical synchronizing pulse. Those television receivers which employ grid-restoration types of sync separators and which are of marginal design, have a tendency to depress the vertical sync pulse beyond cut-off in the sync separator, with the result that vertical synchronization may be lost.

The pulse train 32 represents an augmenting function which is smaller than optimum by 15 percent. The resulting augmented video signal has portions 20D, 22D, 24D, which corresponds to normal video signal portions 20, 22, 24. Here the augmented signal portions are depressed below the nonaugmented signal portions. For the same reasons as indicated for the augmenting signals which are too large, in marginally designed receivers the horizontal synchronizing information during and immediately after the vertical sync and blanking interval tends to be depressed beyond cut-off in the sync separator, and horizontal synchronization may be lost for that period.

The aforementioned problems require that with an augmenting signal which occurs only at a horizontal frequency rate, the augmenting amplitude level in the receiver must be fairly precisely adjusted and maintained. It might be thought that difficulty due to poor augmenting signal level maintenance could be avoided by discontinuing the suppressing and augmenting process during the vertical sync and blanking interval. This is not the case because, in the television receiver, the restoration circuit at the grid of the sync separator is always confused by a difference in relative level of the augmented horizontal sync and the nonaugmented vertical sync. The time constant in these circuits are such that either vertical sync will be lost or impaired, or horizontal sync will be lost or impaired during the vertical interval.

Figure 4:
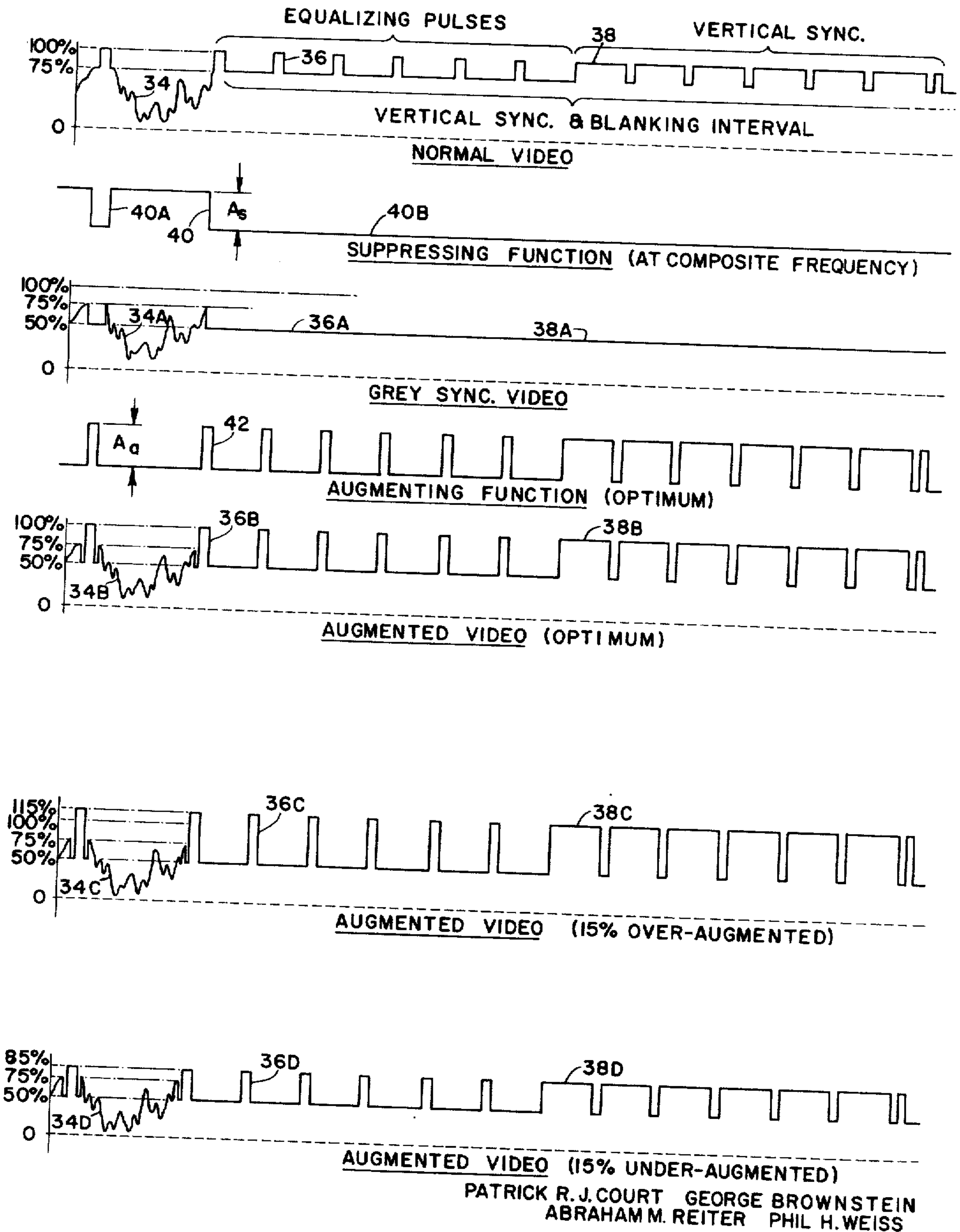

FIGURE 4 is a series of wave shapes illustrating the improvement which occurs when this invention is employed, despite variations in amplitude of the augmenting-function signals. The normal video waveform immediately prior and during the vertical sync and blanking interval includes the visible video signal 34 with a horizontal sync pulse, equalizing pulses 36, and vertical sync pulse 38. The suppressing function wave shape 40 is derived from composite blanking and thus has the composite blanking frequency. Thus, a portion 40A of the suppressing signal has the horizontal sync frequency, and the portion 40B occurring during the vertical sync and blanking interval has the appearance of a long pulse at vertical sync frequency.

The grey-sync video resulting from applying a surpressing function in accordance with this invention is as represented by the waveform 34A, 36A, 38A, where portions of the waveform which correspond to similarly located portions 34, 36, 38 of the normal video waveform have the letter "A" applied.

At a receiver, an optimum-amplitude-augmenting signal 42 is provided. By optimum amplitude here is meant that the composite sync signals in the video signals are restored thereby to their proper levels. The video signal obtained after augmenting is represented by the waveform 34B, 36B, 38B. Any commercial television receiver, even marginal design receivers, have no timing or sync problems with the augmented video signal. The wave shape 34C, 36C, and 38C represents the video signal obtained when the waveform 34A, 36A, 38A is augmented by an augmenting function such as represented by the wave shape 42, which however, has a 15 percent greater amplitude. The video wave shape 34D, 36D, 38D represents a video signal such as 34A, 36A, 38A, which has been augmented by an augmenting function such as represented by the wave shape 42, which however has a 15 percent smaller amplitude. It will be appreciated that regardless of reasonable amplitude variations of the composite horizontal and vertical augmenting functions, the augmented waveform is of substantially standard form. No timing errors exist, and no problems are presented because of relative amplitude of augmented and nonaugmented sync information. All of the sync information is augmented, and the only effect of a change of augmenting level of the indicated amount is a slight change in the brightness level of the picture. There is no critical adjustment of augmenting level necessary, since, by using composite sync for sync-insertion or augmenting, a much greater tolerance is achieved. The problem of faulty interlace is completely overcome.

As previously indicated, the barker audio carrier, which is positioned at the normal program audio carrier location, is frequency-modulated plus or minus 25 percent with the barker audio. In addition, the carrier is approximately 50 percent amplitude-modulated in the negative sense with composite sync. By negative sense is meant that the minimum carrier corresponds to the peak sync value. This modulation waveform is true composite sync and contains no blanking information. In the intervals between the sync pulses, the FM carrier is also approximately 10 percent amplitude-modulated, either with a control subcarrier or a phantom subcarrier.

The control subcarrier frequency is chosen as an odd multiple of one-half horizontal sync frequency. This frequency must not be greater than 250 kilocycles, so that the sideband energy is confined within the television channel band-end. An embodiment of this invention has been built employing a frequency of $^{15,750}/_{2} \times 5 = 39.3$ kilocycles. This is given by way of illustration, and not to be construed as a limitation. The particular frequency relationship is chosen so that the subcarrier frequency, when recovered in an amplitude-modulation detector in the receiver attachment, will be centered between the two nearest adjacent harmonics of the fundamental synchonizing frequency, which will also be present in the same detector. Selective filtering of the detected control subcarrier will thus reject the potentially interfering harmonics of sync.

Figure 5:
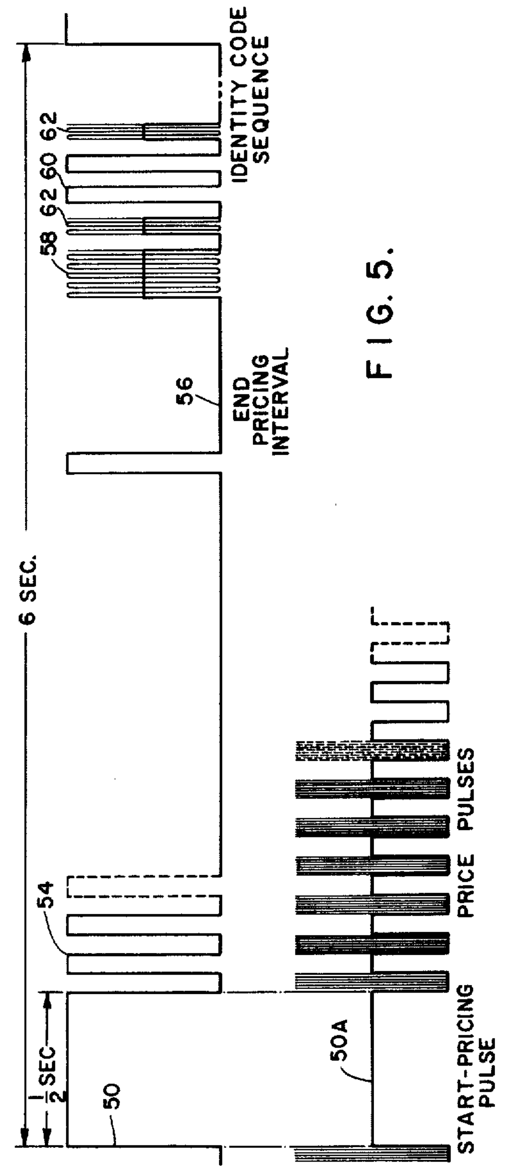
FIGURE 5 is a diagram illustrating a control pulse train of a type which is modulated on the subcarrier in this invention.

In FIGURE 5 there is shown a control pulse train which contains both pricing and recording information. This control pulse train exemplifies data which can be sent.

The pricing and recording information are sent repetitively every six seconds. A typical pricing and recording cycle is shown in FIGURE 5 and includes a first pulse 50 in the sequence, which is known as a start-pricing pulse, and which lasts for half a second duration. This is followed by pricing pulses 54, which are one-twentieth of a second long and which are spaced apart one-twentieth of a second. A maximum of 40 pricing pulses are transmitted. An end-pricing interval 56 of at least half-second duration will follow the last pricing pulse. The pricing interval, including the end-pricing interval, is constant, regardless of the number of pricing pulses being transmitted.

Following the interval allotted for a pricing sequence is a code sequence which represents the program-identification data. Immediately following the interval allotted for a pricing sequence is a tone burst 58, which has a duration of three pulses and which signifies the beginning of the program-identification data. The binary digits for program identification follow the tone burst. In this code sequence, a zero is represented by a pulse 60, having the same amplitude as a pricing pulse. A pulse 62, representing a one, is half of the amplitude of the pulse representing the zero. In addition, however, a low-frequency tone is modulated on the plateau of the half-amplitude pulse. The peak-to-peak amplitude of the tone has the same amplitude as the amplitude of the zero representing the price pulse. The wave shape bearing the same reference numerals 50 and 54, but having the letter "A" appended thereafter, which is shown in FIGURE 5, represents the appearance of the control subcarrier with the control pulses modulated thereon. Since this is negative modulation, as pointed out above, in the presence of a pulse there is minimal subcarrier amplitude and in the absence of a pulse there is a maximum subcarrier amplitude.

A precaution is taken to eliminate the possibility of any interference with the synchronizing information by the control subcarrier within the receiver attachment circuits. This comprises transmitting a "phantom" subcarrier having a frequency which is different than the frequency of the control subcarrier, during the periods when the control subcarrier is absent (i.e., during the control pulse periods). The phantom subcarrier is rejected by the selective circuits in the receiver attachment after detection, and so the control detector responds only to the control subcarrier. However, in the receiver attachment circuits, the likelihood of sync disturbance due to the presence or absence of subcarrier up to the point where sync is stripped from the subcarrier is eliminated. The phantom subcarrier is chosen as an odd multiple of one-half of the horizontal sync frequency. For example, in the embodiment of the invention which was built, the frequency selected was $^{15,750}/_{2}\times 7=55.2$ kilocycles. It should be noted that no subcarrier, either real or phantom, is transmitted during the synchronizing pulse periods themselves.

Figure 6:
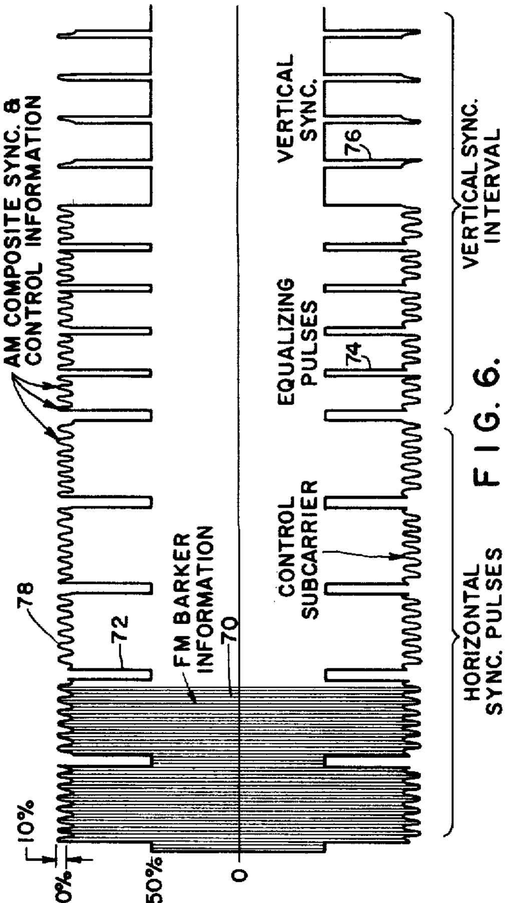
FIGURE 6 is a diagram illustrating the barker audio carrier and its modulation, which are employed in this invention.

Reference is now made to FIGURE 6, which is a wave shape illustrating the appearance of the composite modulation of the barker audio carrier. This includes a wave shape 70, which represents the frequency-modulated barker audio information. The composite sync information is modulated in a negative sense on this carrier, as represented by the pulses 72 for the horizontal sync, 74 for the equalizing pulses, and 76 for the vertical sync pulses. This modulation is a 50 percent amplitude modulation of the carrier. The control subcarrier or the phantom subcarrier is represented by the wave shape 78, and this is only 10 percent amplitude modulated upon the barker audio carrier. This amplitude modulation of the FM carrier is very simply eliminated by the usual limiter circuit which forms a part of the FM detecting circuitry in the receiver of the subscriber.

Figure 7:
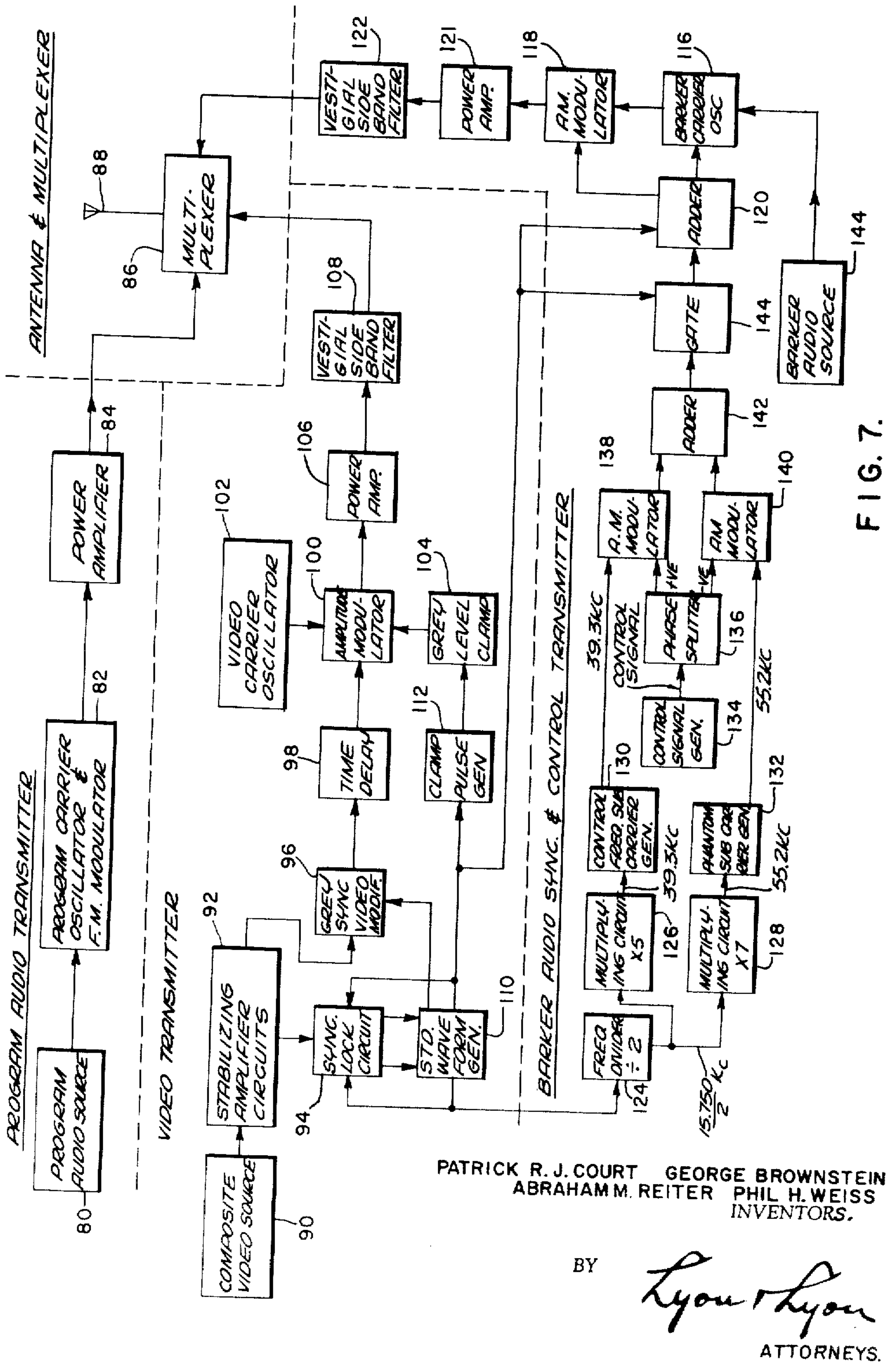
FIGURE 7 is a block diagram of a transmitter in accordance with this invention.

Reference is now made to FIGURE 7, which is a block diagram of a transmitter in accordance with this invention. Program-audio information is derived from a program audio source 80, which may be a microphone or tape, and is applied to a program-carrier oscillator and frequency-modulation modulator 82. This is a well-known circuit which generates the program audio carrier $C_{a1}$ and frequency modulates it with the program audio from the source 80. The output of the program carrier oscillator and frequency modulator 82 is applied to a power amplifier 84. The output of the power amplifier 84 is applied to a multiplexer 86. The multiplexer 86 delivers its output to the antenna 88.

Composite video signals are obtained from a source 90, which may be a live camera, a film scanner, remote pickup, and the like, and is applied to a stabilizing amplifier 92. This comprises circuitry well known in the art, and commercially purchasable, which strips the sync signal from the video, regenerates the sync signal, and re-inserts the clean sync signals into the video. A number of outputs are available from the stabilizing amplifier circuits, such as the sync signals alone, video signals without sync, and video signals with sync. The sync signals alone, which are without blanking signals, and which are hereafter designated as composite sync signals, are delivered to a sync-lock circuit 94. The function of the sync-lock circuit will be discussed subsequently herein.

Composite video signals are applied to circuits designated by the rectangle labeled "grey-sync video modifier" 96. The grey-sync video modifier 96 uses composite blanking signals to "notch" or suppress the video signals to the grey level, thus producing grey-sync video of the type shown in FIGURE 3. The grey-sync video modifier may be a circuit well known in the art as a "diode OR gate." However, upon simultaneously applying both a composite blanking pulse and the composite video signal, its output is a pulse at approximately grey level. The grey-sync video modifier output is applied to a time-delay circuit 98 to be delayed for purposes which will be hereinafter described. The output of the time-delay circuit 98 is applied to an amplitude-modulator circuit 100, which has as its other input the output of a video carrier oscillator 102 and the output of a grey-level clamp circuit 104. This is the well-known black-level clamp circuit used at a video transmitter which, for the purposes of this invention, is operated as a grey-level clamp circuit. The output of the amplitude-modulator circuit 100, comprising video signals with grey-level signals in place of composite sync and blanking modulated on the RF carrier, is applied to a power amplifier 106, the output of which is applied to a vestigial sideband filter 108. The output of the vestigial sideband filter is applied to a multiplexer 86. Filter 108 shapes the video pass-band according to normal Federal Communications Commission specifications.

The purpose of the sync-lock circuit 94 is to synchronize the standard waveform generator 110 with the composite video input which is applied to the stabilizing amplifier circuits 92. The sync-lock circuit 94 and the standard waveform generator circuits 110 are well known in the television art and are commercially purchasable. Thus, the standard waveform generator 110 is driven by signals from the sync-lock circuit 94. The standard waveform generator 110 delivers three outputs. The first comprises composite blanking signals, and this is applied to the grey-sync video modifier 96. A second output comprising composite sync signals are fed back to the sync-lock circuit 94 for comparison and for feeding correction signals as a result to the standard waveform generator 110, and also to a clamp-pulse generator circuit 112. This generates pulses of a standard level from the input, and these pulses are applied to the grey-level clamp circuit 104, the output of which is used to establish the D.C. component of the video at the modulator and to insure 50 percent carrier modulation during the grey-level period.

Barker audio information is derived from a source 114, which can comprise a microphone or a tape, and the like, and which is applied to the barker carrier oscillator and frequency modulator 116 The output comprises the barker audio frequency-modulated on the carrier, and this is applied to an amplitude modulator 11. A second input to the amplitude modulator 118 comprises the output of an adder 120. This adder output consists of composite sync signals and modulated subcarrier signals which are of the type shown in FIGURE 6. These are amplitude-modulated on the barker carrier by the modulator 118. The output of the amplitude modulator 118 drives a power amplifier 121. The output of the power amplifier is applied to a vestigial sideband filter 122, which shapes the signal to have the form indicated by the curve 14 in FIGURE 1. The output of the vestigial sideband filter is applied to the multiplexer 86.

The horizontal-drive signal output of the standard waveform generator 110, besides being fed back to the sync-lock circuit for error correction, is also applied to a frequency-divider circuit 124. This circuit divides the sync frequency by one-half and applies its output to a first multiplying circuit 126 and to a second multiplying circuit 128. These respectively multiply the frequency divider output five times and seven times. The output of the multiplying circuit 126 is a frequency of 39.3 kilocycles, and this is applied to drive a control frequency subcarrier generator 130. The output of the multiplier circuit 128 comprising 55.2 kc. is applied to a phantom subcarrier generator 132.

A control signal generator 134, which may comprise a magnetic tape or drum on which signals have been recorded, or any other known device for generating repetitively pulse trains having the desired pulse information, applies its output, comprising pricing- and program-identification pulses, to a phase splitter 136. The output of the phase-splitter circuit 136 comprises opposite-polarity outputs, one of which drives the amplitude modulator 138 to which are also applied the control-frequency subcarrier signals from the generator 130, and the other output of the phase splitter is applied to the amplitude modulator 140, to be modulated on the phantom subcarrier generator output, also applied to the amplitude modulator 140. The two outputs of the amplitude modulators 138 and 140 are combined in the adder circuit 142, to which they are applied. The output of the adder circuit 142 is applied to a gate circuit 144. Output from the gate circuit 144 is cut off upon the occurrence of a pulse in the composite sync pulse train, which is applied to the gate circuit 144 from the standard waveform generator 110. Composite sync is also applied to the adder circuit 120, where it is combined with the output from the gate circuit 144, which now comprises the composite sync-gated subcarrier.

The total bandwidth of the modulation of the barker audio carrier $C_{a2}$ is approximately two megacycles. This bandwidth is determined primarily by the synchronizing information which is amplitude modulated thereon. As no sideband energy can be allowed to exist outside the six-megacycle channel width, it is necessary to use vestigial sideband transmission, and therefore the vestigial sideband filter 122 is included. The fact that the sideband frequencies of the synchronizing information are interleaved with the sideband frequencies of the video information causes no mutual interference. During blanking time, the video carrier modulation is essentially D.C., so there is no disturbance of the sync carrier. Conversely, the high-frequency sync sidebands occur during video blanking time and are invisible in the picture, just as they are in a normal transmission.

The purpose of the time-delay circuit 98 is to compensate for the fact that in the receiver attachment, the sync information is amplified in a relatively narrow-band IF amplifier. The bandwidth will be standardized at about one megacycle, and consequently in the receiver attachment the sync signals will suffer a time delay of approximately one microsecond greater than that experienced by the video information, which is amplified with full bandwidth. To compensate for the resultant timing error of the sync with respect to the video, the video is delayed by a corresponding amount at the transmitter.

It should be noted that the circuits represented by the boxes within the block diagram are all well-known circuits within the television field, and it is well within the skill of those versed in the art to interconnect these circuits in the manner taught herein and shown in the block diagram of FIGURE 7, after having had the benefit of this information. Accordingly, the detailed circuitry will not be shown and described herein, since it would serve merely to add to the length of this disclosure without adding either additional clarity or information.

Figure 8:
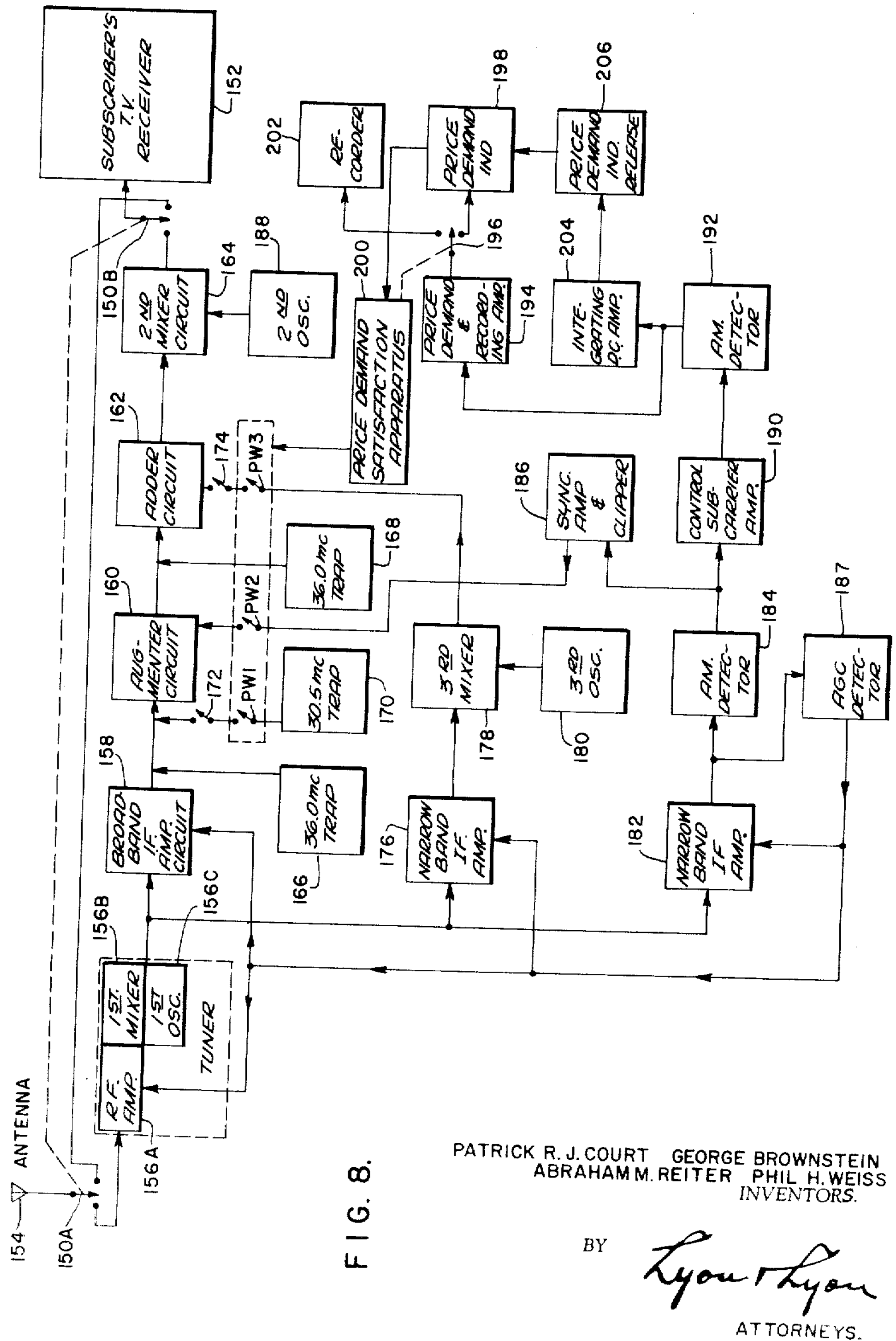
FIGURE 8 is a block diagram of a receiver attachment in accordance with this invention.

FIGURE 8 is a block diagram of a receiver attachment in accordance with this invention. This receiver attachment will operate with any commercially available television receiver, whether it is a monochrome or color receiver. A double-pole, double-throw switch having a first section 150A and a second section 150B in one position will connect the subscriber's television receiver 152 directly to the usual television antenna 154, when it is desired to receive free programs, or to connect the antenna 154 to the receiver attachment and the receiver attachment to the television receiver when it is desired to recieve subscription-television programs. The front end of the receiver attachment, which is connected to the antenna, comprises the usual television RF tuner 156, which includes an RF amplifier 156A, a first mixer 156B, and a first oscillator 156C. The tuner may have provisions for receiving all or any part of the VHF channels 2 through 13 and/or it may have provisions for receiving all or any part of the UHF channels 14 through 83.

The output of the tuner 156 is at some convenient intermediate frequency. For various practical reasons which are discussed later herein, the intermediate frequency is chosen so that the three received carriers are converted to the following intermediate frequencies. $C_{a1}$, the program audio, is converted to 36 megacycles; $C_v$, the video carrier, is converted to 35 megacycles; and $C_{a2}$, the barker audio carrier, is converted to 30.5 megacycles. These frequencies are given by way of illustration and are not to be construed as a limitation upon the invention. All three carriers are amplified in a broad-band IF amplifier 158, which may or may not be included in the augmenter 160, as desired. The output of the broad-band IF amplifier is applied to an augmenter circuit 160; the output of the augmenter circuit is applied to an adder circuit 162; and the output of the adder circuit is applied to a second mixer circuit 164, whose output, in turn, is applied by switch 150B to the subscriber television receiver antenna input terminals.

Two fixed traps, respectively 166 and 168, are connected to the output of the broad-band amplifier 158 and to the output of the augmenter 160. These traps are tuned to 36 megacycles and provide attenuation of the program audio carrier $C_{a1}$, of about 60 db with respect to the video carrier $C_v$, so that the picture reproduced on the subscriber's television receiver is free from visible interference due to program audio carrier. The requirement of about 60 db attenuation of $C_{a1}$ without degrading the vestigial sideband information of $C_v$ is well within the state of the art. For example, the well-known "Bifilar-T" traps, which are employed in color-television receivers, are easily capable of such performance. A third trap 170, which serves to attenuate the barker, sync, and control carrier $C_{a2}$ approximately $-30$ db, may be connected to the output of the broad-band IF amplifier when series-connected switches PW–1 and 172 are closed. The significance of these switches will be described subsequently herein. However, at this time it should be noted that switch 172 is ganged to be operated with a switch 174.

The output of the tuner 156 is also applied to a narrow-band intermediate-frequency amplifier 176. This amplifier is tuned to 36 megacycles, which is the intermediate frequency of the program audio carrier. The output of the narrow-band IF amplifier 176 is applied to a third mixer 178, which receives as its second input the output of an oscillator 180. This oscillator, which will hereafter be designated as the third oscillator, applies a signal having a frequency of five and one-half megacycles to the third mixer, whereby the output of the third mixer will include the program audio signals modulated on a frequency of 30.5 megacycles, which is the same IF frequency as that of the barker audio. The output of the third mixer is thereafter applied through series-connected switches PW–3 and 174 (when closed) to the adder circuit 162.

As a result of the operation of the circuitry just described, the program audio carrier $C_{a1}$ is transposed at IF frequency, to the normal location, that is, at a 4.5 megacycle spacing from the video carrier, which is the position occupied by $C_{a2}$. However, when the switches 172 and 174 and PW–1 and PW–3 are closed, the carrier $C_{a2}$ has been attenuated −30 db by trap 170, so that the transposed $C_{a1}$ easily overrides it. In the subscriber's television receiver, the well-known "capture" effect causes the program audio carrier to completely silence the residual, highly attenuated barker carrier, and only the program audio is heard.

The output of the tuner 156 is also applied to another narrow-band IF amplifier 182, which is tuned to a frequency of 30.5 megacycles. This circuit serves to amplify the barker audio carrier which has been converted to the IF frequency of 30.5 megacycles, and its output is applied to both an amplitude-modulation detector 184 and to an automatic gain-control detector 187. The amplitude-modulation detector 184 detects the amplitude-modulation signals which are modulated on the barker audio carrier which comprise the composite sync signals and the control signals modulated on a subcarrier. Thus, the output of the amplitude-modulation detector 184 is applied to a sync amplifier and clipper circuit 186, which amplifies and clips the sync signals and removes the control subcarrier. The clean composite sync signal is then applied to the augmenter circuit 160 through the switch PW–2 when it is closed. The augmenter circuit 160 is effectively a modulator which is arranged to have a gain during the composite sync pulse periods which is greater than the gain which it has during the intervals between the sync pulses. In an embodiment of the invention, this gain was increased during augmenting intervals to twice what it was during nonaugmenting intervals. Thus, the video RF carrier is augmented during vertical and horizontal sync time only from the 50 percent grey level to the normal 100 percent sync-tip level. In FIGURE 2, the waveform 17B represents the modulated grey-sync video prior to the operation of the augmenter circuit 160, and the modulated video carrier 17C represents the general appearance of the waveform of the video at the output of the augmenter circuit. The video RF carrier is augmented during vertical and horizontal sync time only from the 50 percent "grey level" to the normal 100 percent sync-tip level. The augmented video-modulated carrier is thus substantially normal with the exception that blanking remains at 50 percent of carrier instead of at its normal 75 percent.

The augmented video-modulated carrier is combined in the adder or combining circuit 162 with the transposed program audio carrier, and both carriers are fed into the second mixer circuit 164, which has as its second input the output of a second oscillator 188. The second oscillator 188 oscillates at a frequency such that the second mixer circuit 164 will transpose or convert the IF carrier frequencies to some unused television channel which can be handled by the subscriber's television receiver in the normal manner with which it handles free programs received directly from the antenna 154. The outgoing channel frequencies into the receiver may be the same as those received, but are preferably different from the incoming channel frequencies into the tuner 156. This avoids the possibility of feedthrough and the chance of regeneration by way of leakage in the switches 150A, 150B.

For convenience, the converted output channel may be chosen as one of two adjacent channels. For example, Channel 5 or Channel 6. The FCC allocation insures that one or the other will be unoccupied by a local television station, so that cochannel interference can thus be avoided. The frequency of the second oscillator 188 will also then be confined to the space which exists between Channel 6 and Channel 7 and cannot produce a visible interference in any television channel.

The output of the amplitude-modulation detector 184, besides being fed to the sync amplifier and clipper circuit 186, is also applied to a control subscriber amplifier 190. This is a tuned amplifier which amplifies the control subcarrier at a frequency 39.3 kilocycles, and its output is applied to a detector 192. It should be noted that the control subcarrier amplier 109 rejects the phantom subcarrier completely and delivers only the control subcarrier to the following detector 192. Detector 192 demodulates the control pulses from the control subcarrier and applies these to a price-demand-and-recording amplifier which has its output connected through a switch 196 to a price-demand indicator 198. The output of the price-demand amplifier causes the price-demand indicator 198 to indicate the price of the program in accordance with the number of price pulses in the control pulse train.

Price-demand satisfaction apparatus 200 is provided whereby the price indicated by the price-demand indicator 198 may be paid, either by the deposit of coins therein or by the actuation of a switch indicating the willingness to purchase the program and assume the required financial obligation therefor. The price-demand satisfaction apparatus 200 can then actuate switch 196 to the position connecting the price demand and recording amplifier 194 to the recorder 202, enabling a recording to be made of the control signal train, which includes the identity-code sequence.

Price-demand satisfaction apparatus 200 also actuates switches PW–1, PW–2, and PW–3, whereby the subscriber is enabled to receive the program audio in place of the barker audio and an intelligible video program. The switches 172 and 174 are manually operated switches which are opened at any time that it is desired to hear the barker audio in place of the program audio. This may occur during a program for which payment has been made where the subscriber wishes to obtain some further information being given on the barker channel. Suitable apparatus including the price-demand indicator 198, price-demand satisfaction apparatus 200, and switches 196, PW–1, PW–2, PW–3, which may be employed here, are described and claimed in detail in an application assigned to a common assignee, by John Nyberg, for Coinbox for Subscription Television, Serial No. 706,119, filed December 30, 1957, now U.S. Patent 2,966,980.

A monitor voltage is derived from the control pulse train by applying the output of the detector 192 to an integrating amplifier 204. This establishes a D.C. voltage which is applied to a price-demand indicator release apparatus 206. In the presence of the monitor signal, the price-demand indicator release apparatus is prevented from releasing the price-demand indicator to its blank, or initial starting, position. Should this occur, then the price-demand satisfaction apparatus 200, in turn, is released, whereby switches 196, PW–1, PW–2, and PW–3 are restored to the positions shown in the diagram. This effectively terminates the ability of the subscriber's television receiver to intelligibly reproduce the program video and audio. Thus, by terminating the transmission of control pulses, the transmitter can reset the receiver attachment of a subscriber. An example of apparatus which may be used having a monitor-integrating amplifier and a price-demand-indicator release, as well as a price-demand-and-recording amplifier, is shown and explained in detail in a patent application by Patrick R. J. Court et al., assigned to a common assignee, for Receiver Attachment, Serial No. 709,979, and filed January 20, 1958, now U.S. Patent No. 3,041,439.

Figure 9:
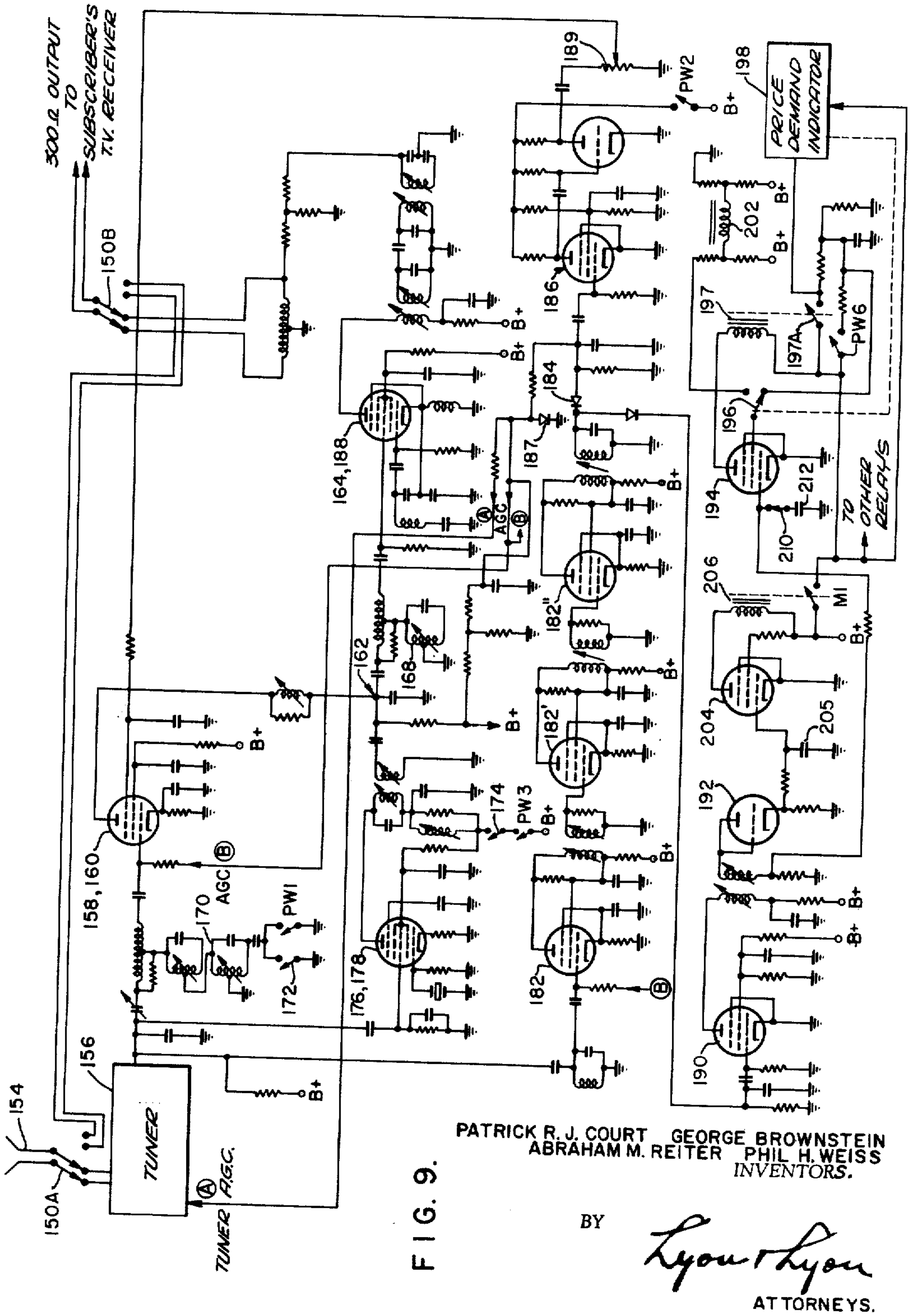
FIGURE 9 is a circuit diagram of a receiver attachment in accordance with this invention.

FIGURE 9 is a circuit diagram for a receiver attachment in accordance with this invention. The apparatus in FIGURE 9, which has the same functions as that exemplified by the blocks in FIGURE 8, will be given the same reference numerals. Thus, the antenna 154 may be connected through switches 150A, 150B, either directly to the receiver or to the receiver through the receiver attachment. The attachment includes the tuner 156, which, as previously pointed out, may be any commercial television tuner. The output of the tuner comprises a broad-band IF frequency of from 30.25 to 36.25 megacycles. In this output, the program audio carrier is attenuated by a 36-megacycle trap 166. A 30.5-megacycle trap 170 for attenuating the barker carrier is connected into the circuit by actuation of switches 172 and PW–1. The augmenter circuit serves at both a broad-band IF amplifier 153 and also to augment or insert sync signals into the signals received from the tuner. It includes a pentode tube having the IF signals from the receiver applied to its control grid. The composite sync signals are derived from the sync amplifier and clipper circuits 186 and are applied to the suppressor grid of the tube in the augmenter circuit to enable it to amplify the signal received at the grid during the interval of a composite sync pulse to a level sufficient to insure the presence of the sync signal when it is stripped from the composite video signal in the subscriber's receiver. It should be borne in mind that no composite sync signals are received, or rather, applied to the augmenter unless and until the subscriber has paid for the program or indicated his desire to be liable for payment. A potentiometer 189 at the output of the sync amplifier and clipper circuits 186 is employed for presetting the proper augmenting level.

The output of the tuner 156 is also applied to a combined oscillator and mixer circuit 176, 178, which serves the function of altering the IF frequency of the program audio carrier to 30.5 megacycles. This is the same IF frequency as the barker audio carrier. This audio IF signal is combined with the output of the augmenter circuit in an adding circuit 162. The output of the adder circuit is connected to a 36-megacycle trap 168, which serves to further attenuate any program audio IF signal which may have passed through the augmenter circuit. In the block diagram it was explained that upon payment of the price demanded for viewing a program, switches such as PW–1 are actuated for the purpose of connecting a 30.5-megacycle trap 170 into the circuit to attenuate the barker audio IF carrier to enable the larger amplitude program IF carrier to capture the subscriber's receiver. From a practical standpoint, the 30.5-megacycle trap 170 is always in the circuit and switch PW–1 is closed, except in the paid position, when it is opened. Switch PW–1 connects a capacitor 171 between the trap and ground. This serves to detune the trap sufficiently so that when PW–1 is closed, the 30.5-megacycle trap does not attenuate the 30.5-megacycle IF signal. Switches 172 and 174 may be operated if it is desired to hear the barker audio while a program is being presented. Switch 172 is closed to permit barker to be heard, snice it parallels PW–1. Normally, switch 172 is maintained in its open position.

The output of the adder circuit 162, which, after price payment, comprises the composite video which is modulated on its IF carrier and program audio modulated on its IF carrier, is applied to an oscillator mixer circuit 164, 188, which serves the function of heterodyning the signals to a suitable frequency so that the following subscriber receiver may satisfactorily reproduce these signals when it is tuned to the subscription-television channel.

The output of the tuner 156 is also applied to a 30.5-megacycle IF amplifier which here includes three stages of amplification 182, 182′, 182″. The output of the third stage 182″ is applied to detector circuit 184, which is employed for detecting the sync which is amplitude-modulated on the barker carrier. The output of the sync detector is applied to the sync amplifier and clipper circuit 186, the output from which is applied across the potentiometer 189, which controls the amplitude of the augmenting function during the presence of composite sync signals.

The output of the 30.5-megacycle IF amplifier is also applied to a control subcarrier detector 184′ for detecting the control subcarrier and its modulation, which were also amplitude-modulated on the FM barker audio carrier. The output of the control subcarrier detector 184′ is applied to the control-subcarrier amplifier 190. The output of the control-subcarrier amplifier 190 is applied to a control pulse detector tube 192. Its output, in turn, is applied to both a monitor amplifier circuit 204, which drives a monitor relay 206 in the presence of control pulses, and also to a pricing amplifier 194. The monitor amplifier circuit 204 includes a capacitor 205 connected between its grid and ground for integrating the control pulses. Thus, the monitor amplifier circuit output is substantially a direct-current voltage as long as control pulses are received. The monitor relay 206, when operated in response to the output of the monitor amplifier 204, closes a contact M–1, which, when closed, enables power to be applied to all other relays which must be maintained operated to enable the receiver attachment to present signals to the subscriber receiver which the subscriber receiver may handle intelligibly.

The pricing amplifier 194 has its control grid connected through a pair of contacts 210 through a capacitor to ground. As a result, the output of amplifier 194 is insufficient to operate the pricing relay 197 until the presence of the long-starting pulse is detected. When this happens, pricing relay 197 is operated, whereby the associated contacts 197A are closed. This causes the price-demand indicator 198 to commence to function. In moving from its no-price indicating position, in response to the first operation of contacts 197A, price-demand indicator opens the contacts of switch 210, thus disconnecting the capacitor 212 from the input grid of tube 194. Thereafter, tube 194 can respond to the shorter pricing pulses. The price-demand indicator will then maintain the switch contacts 210 open until reset at the end of the program by the termination of control pulses, whereby relay 206 becomes inoperative. The structure described insures that the price-demand indicator is actuated in response to a complete pricing pulse train.

When the price demanded has been paid, switch 196 is actuated from the position shown in the diagram to the position which connects it to the recording head 202. Effectively at this time tube 194 operates as a triode and it, together with the recording head 202, records the pulse train, including the tone signals which identify the program which has been purchased.

The AGC delay diode 187 applies the required automatic gain control voltages to the tuner 156 and also to the first stage of the 30.5-megacycle IF amplifier 182.

At the end of the program, the control subcarrier is turned off at the transmitter and the monitor signal disappears at the input to the monitor amplifier, thus releasing relay 206. This releases the price-demand indicator permitting the price-demand indicator to return to a blank, or no-price-demand position. This causes switches PW–1, PW–2, and PW–3 to open, and all the subscriber can now receive is the scrambled (nonsynchronized) picture and the barker audio.

A nonsubscriber without an attachment, if he tunes his television receiver to the pay channel, will see a scrambled picture and hear only the barker audio. The scrambling is very effective in view of the fact that neither vertical nor horizontal sync is present. The scrambled picture, moreover, is further marred by the presence of a very strong one-megacycle intercarrier beat between the video carrier $C_v$ and the program audio carrier $C_{a1}$. The program audio carrier is inaudible.

The fact that the FM barker carrier is also amplitude-modulated with the sync and control signals does not result in any undue disturbance of the barker reproduction. The modulation depth is only 50 percent, and FM reception is basically immune to amplitude modulation of the carrier. Most television receivers also incorporate special limiting arrangements to minimize the effect of amplitude modulation of the sound carrier. What little effect, if any, is of small consequence in any event, since the barker channel is primarily used as an information channel.

The system described is capable of cryptographic use. The presence of the two sound carriers $C_{a1}$ and $C_{a2}$ make possible the alteration of true and false information between these two channels, the selection of the true information being accomplished by cryptographic control signals transmitted, for example, as tone bursts of different frequencies on one or all of the carriers $C_{a1}$, $C_{a2}$, $C_v$.

It is of course to be understood that it is not absolutely necessary to confine the sync information or the control information to the $C_{a2}$ carrier. As an alternate, the information may be modulated on the $C_{a1}$ carrier or shared between them. Clearly, in a cryptographic scheme, this may be necessary. If amplitude modulation information is modulated on a $C_{a1}$ carrier, it may then be necessary to provide amplitude limiting of this carrier within the attachment. Further, it should be understood that the control information does not necessarily have to have the form described above. There are many other types of control signals which can be transmitted to establish a price-demand-and-identity code, and otherwise to control the subscriber's attachment, either with cash or credit or both, either with or without cryptography.

It should be understood that a barker audio signal and carrier are not necessary and may be omitted, if desired, in accordance with the present invention. The program audio carrier $C_{a1}$ is maintained at its indicated location relative to the video carrier and is shifted in location only when a subscriber has paid for a program. Control-signal information, as well as sync-signal restoration information, are modulated on the program audio carrier, in exactly the same manner as has been described for their modulation on the barker audio carrier $C_{a2}$.

Figure 10:
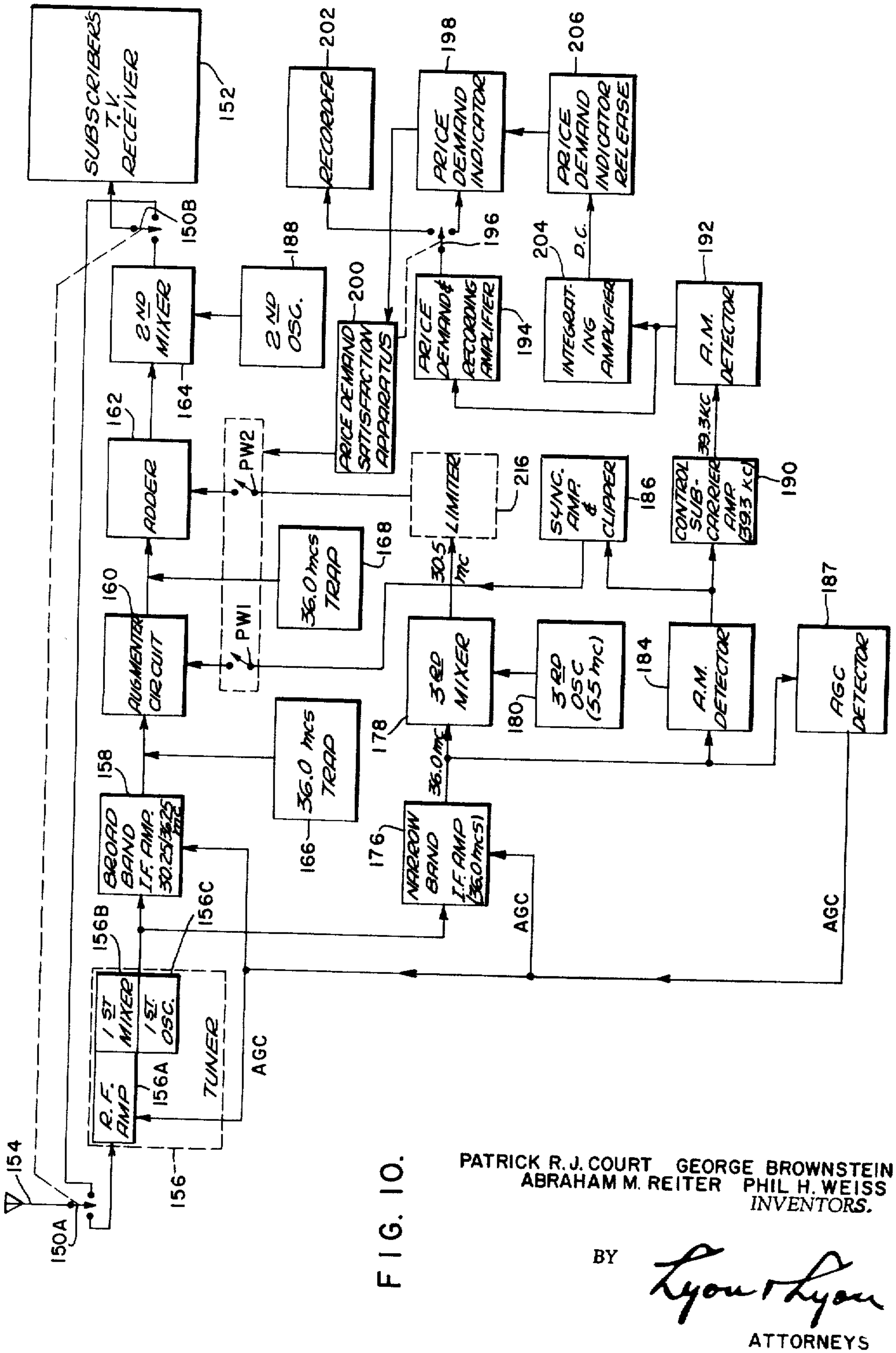
FIGURE 10 is a block diagram of another embodiment of a television receiver attachment in accordance with this invention.

FIGURE 10 is a block diagram illustrating a receiver attachment which can handle signals wherein the barker audio carrier is omitted and the program audio carrier carries frequency-modulated program audio, amplitude-modulated composite sync-insertion signals, and amplitude-modulated phantom and control subcarrier signals on which control signals have been amplitude-modulated. Those structures represented on the block diagram which are similar to the ones shown in FIGURE 8 and which function in similar fashion bear similar reference numerals. From this it will be seen that the receiver attachment operates substantially identically to the receiver attachment shown in FIGURE 8, except that, since there is no barker carrier, no provision in the form of 30.5-megacycle traps need be made to attenuate this carrier when program audio is heard. Further, since the program audio carrier has sync-insertion and control signals, the demodulation operation is done on the program audio carrier.

The antenna 154 applies the received signals over switch 150A to the tuner 150. The output of tuner 150, consists of video at an intermediate frequency of 35 megacycles and program at an intermediate frequency of 36 megacycles. These are applied to be amplified by an amplifier 158 and also are applied to a narrow-band IF amplifier 176. The output of the amplifier 158 is applied to the augmenting circuit 160. A 36-megacycle trap 166 on the augmenting circuit input and one 168 on the output attenuates the program audio carrier by 60 db, so that it will not interfere with the video reproduction.

The narrow-band IF amplifier 176 separates the 36-megacycle carrier from the video carrier. The output of the narrow-band IF amplifier is applied to a third mixer 178, to an amplitude-modulation detector 184, and to an automatic-gain-control detector 187. The third mixer 178 also receives input from a third oscillator 180, whereby it can convert the 36-megacycle intermediate frequency to 30.5 megacycles, which places this carrier at the normal and governmentally approved location relative to the video carrier. The third mixer output of 30.5 megacycles may be applied to a limiter 216 to eliminate any amplitude modulation thereon. The output of the limiter, when the price demanded for a program has been paid, is connected through switch PW–2 to the adder 162.

The amplitude-modulation detector 184 detects both the sync-insertion signal and the control subcarrier, which are modulated on the 36-megacycle IF carrier. The sync amplifier and clipper circuits 186 reshape and amplify the composite sync signals. These are applied to the augmenting circuit 160 through switch PW–1 when the program has been paid. The control subcarrier amplifier 190 amplifies the true control subcarrier signal and rejects the phantom subcarrier. The amplitude-modulation detector 192 then detects the control signals. The attachment processes the control signals in the same manner as has been described in FIGURE 8.

The output of the adder 162, before payment of the demanded price, consists only of video IF signals without synchronizing information. After such payment, the adder output consists of the composite video IF signals and program audio IF signals properly placed relative thereto. These signals are processed by the second mixer 164 and oscillator 188 to transpose this output to an available channel frequency.

The IF frequencies shown in the foregoing description of this invention were selected so that none of their harmonics fall within the output channel of the second mixer 164, to provide selective filtering with a minimum of difficulty or interference where required, and to be different from those of a standard television receiver so that there will be no visible beats between the attachment oscillator and the television receiver oscillator. However, these frequencies are not to be considered as the only ones which can be employed, and it is not intended that the embodiment of the invention be so restricted. Those skilled in the art, after having had the benefit of this disclosure, can select other frequencies or other circuit arrangements whereby the program audio carrier is prevented from being heard or interfering with the barker audio carrier before the purchase of a program and the barker audio will be heard by the subscriber receiver, but upon the purchase of the program the barker audio is prevented from interfering with the reproduction of the program audio. This may be done, for example, by translating the program audio carrier frequency to the same value as that of the barker audio carrier, instead of at an intermediate-frequency carrier, whereby the capture effect may be employed to enable the subscriber receiver to only reproduce the program audio. This arrangement effectively falls within the scope of this invention and the claims which are directed thereto.

Foreign television standards differ from those of the United States in a number of respects. Two important differences are, first, the polarity of the video carrier modulation may be different from that used in the United States, and, second, the audio carrier may be amplitude-modulated instead of frequency-modulated. For example, in Great Britain, the video carrier is positively modulated and the audio carrier is amplitude modulated. Other countries use negative modulation of the video carrier and amplitude modulation of the audio carrier. Regardless of this, the basic concepts previously described are valid. Of course, some modifications may be necessary in order to accommodate these different standards; however, these modifications fall within the scope of the basic inventive concepts.

Figure 11:
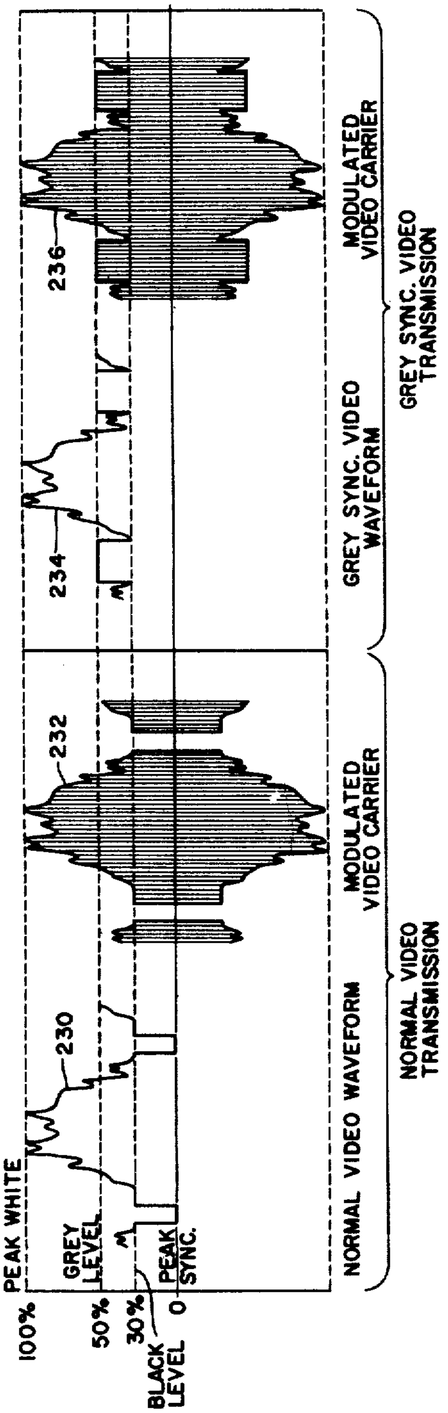
FIGURE 11 is a response-curve drawing illustrating British television standards and how this invention would affect such wave shapes.

Reference is now made to FIGURE 11, which is a wave shape drawing illustrating British television standards and how this invention would affect such wave shape. The wave shape 230 represents the normal British video, and wave shape 232 shows such normal British video modulated on a carrier. The carrier modulation is such that peak carrier corresponds to peak white; zero carrier (approximately −30 db) corresponds to peak sync; black level corresponds to 30 percent carrier. The wave shape 234 illustrates how a grey-sync video waveform would appear when British standards are involved, and wave shape 236 shows how the carrier modulated with that video waveform would appear. Employing the British standards, the carrier would remain at grey level during both the horizontal and vertical blanking periods. Grey level would correspond to approximately 50 percent carrier level, which, in turn, represents about 29 percent of the video excursion from black to peak white.

As was previously described, composite sync information would be transmitted upon another carrier in the channel, and would be demodulated in a receiver attachment. Instead of augmenting the carrier during sync time in the receiver attachment, the carrier has to be suppressed to "zero," or about −30 db. This can be accomplished in a modulator, chopper, or gate which has the grey-sync carrier as one input and composite sync as another input.

Figure 12:
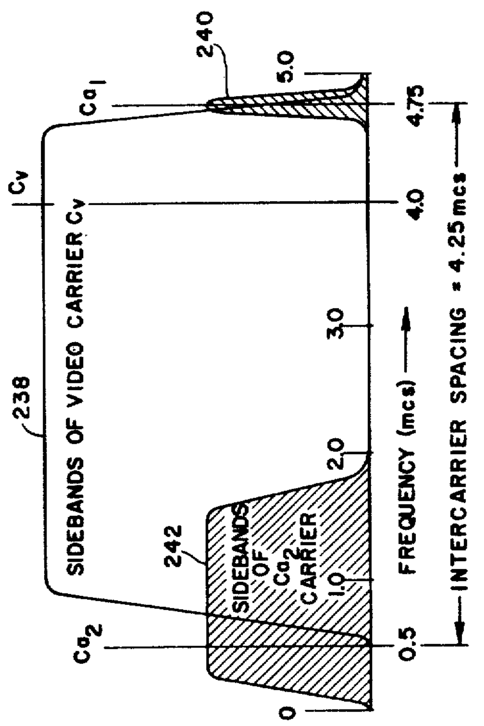
FIGURE 12 is a drawing illustrating carrier frequency placement when this invention is employed with British standards.

Reference is made to FIGURE 12, which is a response-characteristic drawing illustrating the relative carrier frequency placement which may be employed when this invention is employed with British standards. The video carrier represented by $C_v$ is centered at four megacycles relative to the lower band-end, with the vestigial sideband frequencies on the high side of the four megacycles. The wave shape representing the sidebands of the video carrier bears reference numeral 238. The program audio carrier $C_{a1}$ is centered at 4.75 megacycles relative to the lower band-end, and its sidebands are represented by the wave shape 240. The barker audio carrier $C_{a2}$ is centered at .5 megacycle relative to the lower band-end, and it and its sidebands are represented by the wave shape 242.

The barker audio carrier will be 30 percent amplitude-modulated with barker audio. Accordingly, the barker carrier can have the sync and control information frequency-modulated thereon. The subscriber's receiver does not respond to the frequency modulation, so this information will produce little, if any disturbance of the reproduced audio. In the receiver attachment, the amplitude-modulated audio will produce little, if any, disturbance of the frequency-modulated detected sync and control information. A limiter may be provided in this attachment, if necessary.

Program audio carrier may be transposed exactly as before by any of the above methods; however, if it has to override a barker carrier, the capture effect cannot be used. The capture effect only operates with frequency modulation. To successfully override the barker carrier, without residual audible crosstalk, the barker carrier has to be suppressed to −60 db. Thus, four traps instead of three, as previously shown, each with 30 db attenuation, are required in the receiver attachment. Accordingly, the transmission where British standards are involved, will be represented by the wave shapes in FIGURE 11, with the program audio carrier being amplitude-modulated in the normal manner and the barker audio carrier being amplitude-modulated with barker audio, and frequency-modulated with both composite sync and control and phantom subcarriers.

Figure 13:
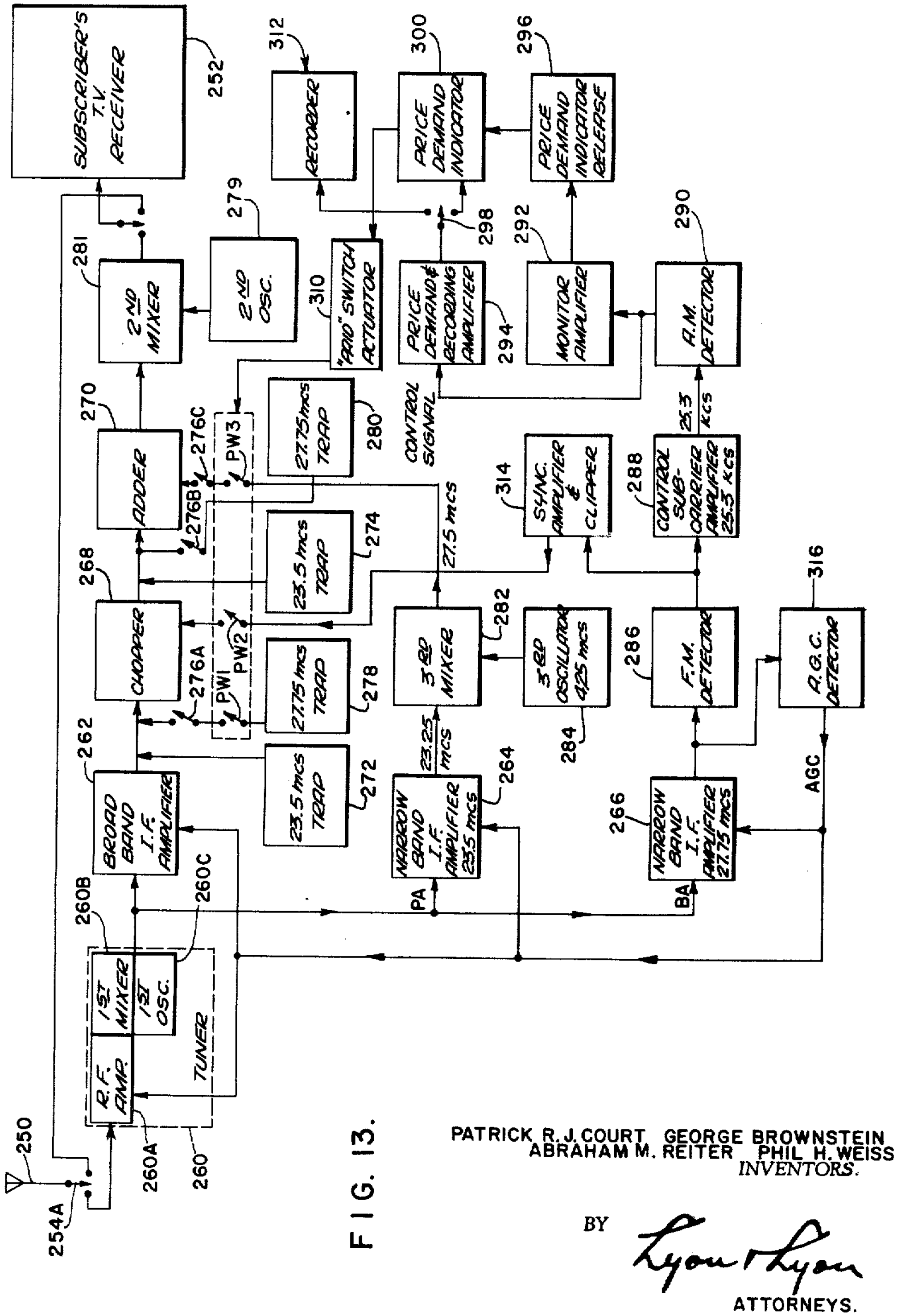
FIGURE 13 is a block diagram of a receiver attachment for a British subcarrier receiver in accordance with this invention.

FIGURE 13 is a block diagram of a receiver attachment for a British subscriber receiver in accordance with this invention. As before, the antenna 250 can be either directly connected to the antenna input terminals of a subscriber receiver 252 by throwing the switches 254A, 254B to one set of terminals, or the antenna 250 can be connected to the antenna terminals of the subscriber receiver through the attachment by moving the switch 254A, 254B to the other set of terminal. The antenna 250 is connected in the attachment to a tuner 260, which includes an RF amplifier 260A, a first mixer 260B, and a first oscillator 260C.

The IF frequency values which will be given are exemplary of those which may be used and as previously indicated should not be considered as a limitation upon the invention. However, those selected are chosen to have no harmonics in either converted channel 4 or 5 (British), and they are also chosen to fall below the standard British IF band (30 to 35 megacycles). The IF is also chosen so that when the $C_{a1}$ carrier is transposed to $C_{a2}$ frequency, it is an odd multiple of one-half the frequency of the intercarrier separation of $C_{a1}$ and $C_{a2}$. Thus, the output of the tuner 260 will be a broad IF frequency range between 23 megacycles and 28 megacycles. A broadband amplifier 262 receives the output of the tuner 260 and also a first and second narrow-band amplifier, respectively 264, 266. The first mixer and first oscillator 260B and 160C in the tuner convert the video carrier $C_v$ to an IF of 24.25 megacycles, the barker audio carrier to an IF of 27.75 megacycles, and the program audio carrier to an IF of 23.5 megacycles. Thus, the first narrow-band IF amplifier 264 selects and amplifies the program audio IF, and the second narrow-band amplifier 266 selects and amplifies the barker audio IF.

The output of the broad-band IF amplifier is applied to a chopper 268, and the output of the chopper 268 is applied to an adder circuit 270. There is connected to the input to the chopper and to its output two 23.5-megacycle traps, respectively 272, 274, which serve the function of tenuating the amplitude of the program audio IF signal by −60 db. There may also be connected to the input and output of the chopper circuit 268 via switches 276A, 276B, PW-1 and PW-3, the respective 27.75-megacycle traps 278, 280. As in the description of the receiver attachment for American standards, these two barker audio IF traps are connected in only after payment for the program has been made. They attenuate the barker audio IF signal by −60 db. The program audio IF carrier is applied to a third mixer circuit 282, wherein it is heterodyned with the output of a third oscillator circuit 284, to produce as an output an IF program audio carrier at 27.75 megacycles, which is the same frequency as that of the barker audio IF carrier. This latter program audio IF is applied to the adder via a switch PW-4, which is connected in series with a switch 276C. The switch PW-4 is operated after program payment has been made. The adder 270 thus combines the video IF with the program audio IF transposed to its normal relative position, where it can be reproduced by the subscriber's receiver 252. The adder output is applied to a second mixer 281. A second oscillator 279 provides the necessary signals for shifting from the intermediate frequency to the channel frequency desired.

The narrow-band IF amplifier 266 selects the barker audio program IF carrier. Its output is applied to a frequency-modulation detector 286, which detects the control subcarrier as well as the composite sync signals. The output of the FM detector 286 is applied to the control subcarrier amplifier 288, which separates the control subcarrier from its input and then applies this signal to an amplitude-modulation detector 290.

Since the British horizontal frequency is 10.125 kilocycles, the control subcarrier may be chosen as $^{10.125}/_{2}\times N$ kilocycles, where N is an odd integer. For example, $^{10.125}/_{2}\times 5=25.3$ kilocycles. The phantom subcarrier may be chosen as $^{10.125}/_{2}\times 7=35.4$ kilocycles.

The output of the amplitude-modulation detector 290, which comprises the control pulse train substantially identical with the one previously described, is applied to the monitor amplifier 292 and also to the price-demand-and-recording amplifier 294. The monitor amplifier, in the presence of control signals, will hold all the apparatus operative until the termination of such control signals. Rectangle 296, labeled "price-demand-indicator release," represents the relays which are held operative by the monitor amplifier as long as it receives control signals.

The control signals are applied to a price-demand-and-recording amplifier 294, which amplifies these signals and applies them through a switch 298 to the price-demand indicator apparatus 300. This apparatus indicates, in response to the number of control signals received, the price required to be deposited before the program can be seen. Either by operation of a credit switch or by deposit of coin, a "paid switch actuator" 310 is enabled to operate the switch PW-1, PW-2, PW-3 and PW-4, whereby the barker audio IF traps 278 and 280 are connected to the output of the broad-band IF amplifier 262, composite sync signals are connected to the chopper 268, to enable it to insert these sync signals in the video, and program audio IF signals are applied to the adder 270. At that time, the recorder 312 is enabled to record signals from the price-demand-and-recording amplifier 294, since the switch 298 will be actuated to connect these signals to the recorder.

The output of the FM detector 286 is applied to a sync amplifier and clipper circuit 314. As just described, the output of this sync amplifier and clipper circuit 314 comprises the composite horizontal and vertical sync signals. These are applied through switch PW-2 to the chopper 268 to reduce the amplitude of the grey sync modulated on the video carrier to the proper level in accordance with the British standards. This composite sync is used in the chopper to attenuate the carrier to approximately −30 db, the value indicated as proper.

The attenuation required for both the $C_{a1}$ and $C_{a2}$ carriers is 60 db or greater, and hence the two traps are used for each frequency. When the subscriber wishes to hear the barker carrier during a program, switches 276A and 276B are used to disable the barker traps, and switch 276C is used to disable the output of the third mixer 282.

An automatic-gain-control detector 316 is employed for AGC purposes. It is connected to the output of the narrow-band IF amplifier 266. In turn, it applies AGC back to this amplifier, to the tuner, and to the broad-band IF amplifier 262.

There has accordingly been described and shown herein a novel, useful system for transmitting and receiving subscription-television programs wherein, within the bandwidth limitations imposed by regulatory governmental agencies, all the information required at a receiver in a subscription-television system for properly interpreting the information being transmitted is made available upon the proper credit arrangement being made, yet an intelligible program is withheld from nonsubscribers and nonpaying subscribers.

It should be understood that the invention described herein is suitable for use in systems where transmission of signals occurs from a transmitter to a receiver over the air or by using wire or metallic conductors. Thus, this invention is not to be construed as limited to the use of a radiating type transmitter. The word transmit, when used herein and in the claims, is intended to cover both transmission systems as well as transmission systems which use metallic conductors for one portion of the transmission and radiation for the other. Furthermore, it is to be understood that although the transposition of frequencies, such as that of the program audio carrier in the receiver attachment, is shown being carried out with carriers at intermediate frequencies, this should not be construed as a limitation upon the invention, since other arrangements well known in the art may be used, such as demodulation and remodulation upon a new carrier, without departing from the spirit and scope of the claims herein. Further, the composite sync signal information may be transmitted to a receiver attachment in some other form, rather than as amplitude-modulation on a carrier, such as a coded signal, without departing from the spirit and scope of the claims herein.

We claim:

1. A television secrecy system comprising at a transmitter means for generating video signals having grey-level signals instead of composite blanking and synchronizing signals, means for generating the composite synchronizing signals for said video signals, means for generating a video carrier, means for modulating said video signal on said video carrier, means for generating an audio carrier, means for modulating said composite synchronizing signals on said audio carrier, and means for transmitting said modulated video and audio carriers; at a receiver means for receiving said modulated video and audio carriers, means for demodulating the composite synchronizing signals from said audio carrier, and means for inserting composite synchronizing signals in said video signals while modulated on its carrier responsive to said demodulated composite synchronizing signals.

2. In a subscription-television system wherein subscription-television programs are transmitted to a subscriber receiver, a transmitter having means for generating video signals, means for generating program audio for said video signals, means for generating a video carrier, means for modulating said video signals on said video carrier, means for generating an audio carrier having a frequency whereby it is located elsewhere than at the location relative to the video carrier which said subscriber receiver can process, means for modulating said program audio on said audio carrier, means for transmitting said video and audio carriers, a subscriber receive attachment for receiving said video and audio carriers, controllable means for shifting when operative the frequency of said audio carrier to a location relative to the video carrier which said subscriber receiver can process, and means for controlling the operability of said controllable means.

3. A television secrecy system comprising at a transmitter means for generating video signals having grey-level signals instead of composite blanking and synchronizing signals, means for generating the composite synchronizing signals for said video signals, means for generating a video carrier, means for modulating said video signal on said video carrier, means for generating an audio carrier, means for modulating said composite synchronizing signals on said audio carrier, and means for transmitting said modulated video and audio carriers; at a receiver means for receiving said modulated video and audio carriers, means for converting said modulated video carrier to a first intermediate frequency and said modulated audio carrier to a second intermediate frequency, means for demodulating said composite synchronizing signals from said second intermediate frequency, and means for augmenting said first intermediate frequency responsive to said demodulated composite synchronizing signals for inserting composite synchronizing signals in the video signals.

4. A subscription-television system comprising a transmitter having means for generating video signals having grey-level signals instead of composite blanking and synchronizing signals, means for generating composite synchronzing signals for said video signals, means for generating audio signals, means for generating video carrier signals, means for modulating said video signals on said video carrier, means for generating audio carrier signals, means for frequency-modulating said audio signals on said audio carrier, means for amplitude-modulating said composite synchronizing signals on said audio carrier signals and means for transmitting said modulated video and audio carrier signals, a subscriber receiver attachment having means for receiving said transmitted modulated video and audio carrier signals, means for converting said received video and audio carrier signals respectively to first and second intermediate-frequency signals, means for demodulating said composite synchronizing signals from said second intermediate-frequency signals, means for augmenting said first intermediate-frequency signals responsive to said demodulated composite synchronizing signals to insert composite synchronizing signals thereon, and means for converting said augmented first intermediate frequency and said second intermediate frequency respectively to video and audio carrier frequencies which are different than those received and which are suitable for processing by a subscriber receiver.

5. In a subscription-television system a transmitter having means for generating first audio signals, means for generating second audio signals, means for separately transmitting said first and second audio signals, a receiver attachment including means for receiving said first and second audio signals, a combining circuit having two input terminals and an output terminal, means for applying said first audio signals to one of said combining-circuit input terminals, first means connected to said one of said combining input terminals for attenuating said second audio signals to a level below which they will not interfere with reproduction of said first audio signals, normally inoperative means for applying said second audio signals to said other combining-circuit input terminal, second means for attenuating said first audio signals to a level at which they will not interfere with the reproduction of said second audio signals, normally open switch means for connecting said second means for attenuating to said one of said two combining circuit inputs, and means for rendering operative both said normally inoperative means for applying said second audio signals and said normally open switch means.

6. In a subscription-television system as recited in claim 5 wherein said means for separately transmitting said first and second audio signals includes means for generating first carrier signals, means for generating second carrier signals at a frequency different from said first carrier signals, means for modulating said first audio signals on said first carrier signals, means for modulating said second audio signals on said second carrier signals, said means for receiving said first and second audio signals includes means for converting said first and second carrier signals respectively to first and second intermediate frequencies, and said normally inoperative means for applying said second audio signals to said other combining-circuit input terminal includes means for translating said second carrier signals to the frequency of said first carrier signals.

7. A subscription-television system comprising a transmitter having means for generating video signals having grey-level signals instead of composite blanking and synchronizing signals, means for generating composite synchronizing signals for said video signals, means for generating first audio signals, means for generating second audio signals, means for transmitting said video signals, composite synchronizing signals, first audio signals and second audio signals, and a receiver having means for receiving said video signals, composite synchronizing signals, first audio signals and second audio signals, output terminals for said receiver, means for applying said video signals and first audio signals to said output terminals from said means for receiving including means for attenuating said second audio signals, first inoperative means for inserting synchronizing signals in said received video signals responsive to said composite synchronizing signals, second inoperative means for applying said second audio signals to said output terminals in place of said first audio signals including means for preventing said first audio signals from interfering with reproduction of said second audio signals, and means for rendering said first and second inoperative means operative.

8. A subscription-television system comprising a transmitter having means for generating first audio signals, means for generating second audio signals, means for generating first audio carrier signals, means for generating second audio carrier signals at a frequency which is different from said first audio carrier signals, means for frequency modulating said first audio signals on said first audio carrier, means for frequency-modulating said second audio signals on said second audio carrier, and means for transmitting said modulated first audio and second audio carrier signals, a receiver attachment including means for receiving said modulated first and second audio carrier signals, output terminals on said receiver attachment, an adder circuit coupled between the output of said means for receiving and said output terminals, frequency-translation means coupled to said means for receiving output for shifting the carrier frequency of said received second audio signals to that of said received first audio signals, first normally open switch means for applying when operated said frequency translation means output to said adder circuit, means for attenuating said first audio carrier signals an amount sufficient to enable said second audio carrier to over-ride said first audio carrier when said first switch means is rendered operative, second normally open switch means for connecting when operated said means for attenuating said first audio carrier signals between the output of said means for receiving and said adder circuit, and means for rendering said first and second switch means operative.

9. A subscription-television system as recited in claim 8 wherein said means for receiving said first and second audio carrier signals includes means for respectively translating these frequencies to first and second intermediate carrier frequencies; and there is included between said adder circuit and said output terminals means for translating the output of said adder circuit to a carrier frequency which is different from the carrier frequencies received by said means for receiving.

10. A subscription-television system comprising a transmitter having means for generating video signals having grey-level signals in place of composite blanking and synchronizing signals, means for generating composite synchronizing signals for said video signals, means for generating video carrier signals, means for modulating said video signals on said video carrier signals, means for generating first audio signals, means for generating second audio signals, means for generating first audio carrier signals at one frequency and second audio carrier signals at a different frequency, means for modulating said first audio signals on said first audio carrier signals, means for modulating said second audio on said second audio carrier signals, means for modulating said composite synchronizing signals on said first audio carrier signals, and means for transmitting said modulated video, first audio, and second audio carrier signals, a receiver attachment including means for receiving said modulated video, first audio and second audio carrier signals, output terminals on said receiver attachment, means coupling said means for receiving to said output terminals including an augmenting circuit coupled to receive output from said means for receiving, an adding circuit coupled to receive output from said augmenting circuit, and means for attenuating said second audio carrier signals to a level sufficiently low not to interfere with the reproduction of said video signals, means coupled to said receiver attachment output for demodulating said composite synchronizing signals from said received first audio carrier signals, first normally open switch means for applying when operated said composite synchronizing signals to said augmenting circuit for inserting composite synchronizing signals in said video signals, means for attenuating said first audio carrier signals to be below a predetermined level, second normally open switch means for connecting when operated said means for attenuating said first audio carrier signals to said means coupling said means for receiving to said output terminals prior to said adding circuit, frequency-translating means coupled to said means for receiving output for shifting the frequency of said second audio carrier to that of said first audio carrier, third normally open switch means for applying when operated said frequency translating means output to said adding circuit for overriding therewith said first audio carrier, and means for rendering said first, second, and third switch means operative.

11. A subscription-television system comprising a transmitter having means for generating first audio signals, means for generating second audio signals, means for generating control signals, means for generating control subcarrier signals, means for modulating said control signals on said control subcarrier signals, means for generating first audio carrier signals, means for generating second audio carrier signals at a frequency which is different from said first audio carrier signals, means for frequency modulating said first audio signals on said first audio carrier, means for frequency modulating said second audio on said second audio carrier, means for amplitude modulating said modulated control subcarrier signals on said first audio carrier signals, and means for transmitting said modulated first audio and second audio carrier signals, a receiver attachment including means for receiving said modulated first and second audio carrier signals, output terminals on said receiver attachment, an adder circuit coupled between the output of said means for receiving and said output terminals, frequency translation means coupled to said means for receiving output for shifting the carrier frequency of said second audio carrier to that of said first audio carrier, first normally open switch means for applying when operated said frequency translation means output to said adder circuit, means for attenuating said first audio carrier signals an amount sufficient to enable said second audio carrier to override said first audio carrier when said first switch means is rendered operative, second normally open switch means for connecting when operated said means for attenuating said first audio carrier signals between the output of said means for receiving and said adder circuit, means connected to said means for receiving output for demodulating said modulated control subcarrier signals from said received first audio carrier signals, means for demodulating said control signals from said control carrier signals, and means to which said control signals are applied for rendering said first and second switch means operative.

12. A subscription-television system comprising a transmitter having means for generating video signals having grey-level signals in place of composite blanking and synchronizing signals, means for generating composite synchronizing signals for said video signals, means for generating video carrier signals, means for modulating said video signals on said video carrier signals, means for generating first audio signals, means for generating second audio signals, means for generating first audio carrier signals at one frequency and second audio carrier signals at a different frequency, means for modulating said first audio signals on said first audio carrier signals, means for modulating said second audio on said second audio carrier signals, means for modulating said composite synchronizing signals on said first audio carrier signals, means for generating control signals, means for generating control subcarrier signals, means for modulating said control signals on said control subcarrier signals, means for modulating said modulated control subcarrier signals on said first audio carrier signals, and means for transmitting said modulated video, first audio, and second audio carrier signals, a receiver atttachment including means for receiving said modulated video, first audio and second audio carrier signals, output terminals on said receiver attachment, means coupling said means for receiving to said output terminals including an augmenting circuit coupled to receive output from said means for receiving, a combining circuit coupled to receive output from said augmenting circuit, and means for attenuating said second audio carrier signals to a level sufficiently low not to interfere with the reproduction of the video signals, means coupled to said receiver attachment output for demodulating said composite synchronizing signals from said first audio carrier signals, first normally open switch means for applying when operated said composite synchronizing signals to said augmenting circuit for inserting composite synchronizing signals in said video signals while modulated on sad first intermediate-frequency signals, means for attenuating said first audio carrier signals to be below a predetermined level, second normally open switch means for connecting said means for attenuating said first audio carrier signals to said augmenting circuit, frequency-translating means coupled to said means for receiving output for shifting the carrier frequency of said second audio carrier to that of said first audio carrier, third normally open switch means for applying when operated said frequency translating means output to said combining circuit for overriding therewith said first carrier, means connected to said means for receiving for demodulating said modulated control subcarrier signals therefrom, means to which said modulated control subcarrier signals are applied for demodulating said control signals therefrom, and means to which said control signals are applied for rendering said first, second, and third switches operative.

13. A subscription-television system comprising a transmitter having means for generating video signals having grey-level signals in place of composite blanking and synchronizing signals, means for generating composite synchronizing signals for said video signals, means for generating video carrier signals, means for modulating said video signals on said video carrier signals, means for generating first audio signals, means for generating second audio signals, means for generating control signals, means for generating control subcarrier signals, means for amplitude modulating said control signals on said subcarrier signals, means for generating first audio carrier signals, means for frequency modulating said first audio signals on said first audio carrier signals, means for amplitude modulating said composite synchronizing signals on said frequency-modulated first audio carrier signals, means for amplitude modulating said modulated control subcarrier signals on said amplitude and frequency-modulated first audio carrier signal, means for generating second audio carrier signals, and means for frequency modulating said second audio signals on said second audio carrier signals, means for transmitting all said modulated carrier signals, a receiver attachment including means for receiving all said modulated carrier signals and converting said video carrier, first audio carrier and second audio carrier respectively to first, second and third intermediate-frequency signals, output terminals on said receiver attachment, means coupling said means for receiving to said output terminals including an augmenting circuit coupled to receive output from said means for receiving, an adding circuit coupled to receive output from said augmenting circuit, and means for attenuating said third intermediate frequency signals to a level sufficiently low not to interfere with the reproduction of the video signals, means coupled to said receiver attachment output for demodulating said composite synchronizing signals from said second intermediate-frequency signals, first normally open switch means for applying when operated said composite synchronizing signals to said augmenting circuit for inserting composite synchronizing signals in said video signals while modulated on said first intermediate-frequency signals, means for attenuating said second intermediate-frequency signals to be below a predetermined level, second normally open switch means for connecting when operated said means for attenuating said second intermediate-frequency signals to said means coupling said means for receiving to said output terminals prior to said adding circuit, frequency-translating means coupled to said means for receiving output for shifting the carrier frequency of said third intermediate frequency to that of said second intermediate frequency, third normally open switch means for applying when operated said frequency-translating means output to said adding circuit for over-riding therewith said second intermediate frequency, means connected to said means for receiving for demodulating said modulated control subcarrier signals therefrom, means to which said modulated control subcarrier signals are applied for demodulating said control signals therefrom, and means to which said control signals are applied for rendering said first, second and third switches operative.

14. A subscription-television system as recited in claim 13 wherein there is included at said transmitter means for generating a phantom control subcarrier, means for amplitude-modulating said control signals on said phantom control subcarrier in phase opposition to said control signals being modulated on said carrier, and means for modulating said modulated phantom subcarrier on said first audio carrier signals during intervals when said composite synchronizing signals and said control subcarrier are not modulated on said first audio carrier signals.

15. In a subscription-television system of the type wherein there are transmitted modulated on a video carrier video signals having grey-level signals instead of blanking and synchronizing signals, and sync-insertion signals modulated on another carrier, an attachment for a subscriber receiver comprising means for receiving said video carrier and other carrier, means for demodulating said sync-insertion signals from said other carrier, controllable means for inserting synchronizing signals when rendered operative in said video signals within said grey-level signals while still modulated on a carrier responsive to said demodulated sync-insertion signals, and means for rendering operative said controllable means whereby synchronizing signals are inserted in said video signals.

16. In a subscription-television system of the type wherein there are transmitted modulated on a video carrier video signals having grey-level signals instead of composite blanking and synchronizing signals, and composite synchronizing signals modulated on another carrier, an attachment for a subscriber receiver comprising means for receiving said video carrier and other carrier, means for demoduating said composite synchronizing signals from said other carrier, controllable means for inserting composite synchronizing signals when rendered operative in said video signals while still modulated on a carrier responsive to said demodulated composite synchronizing signals, and means for rendering operative said controllable means whereby composite synchronizing signals are inserted in said video signals.

17. In a subscription-television system of the type wherein there are transmitted modulated on a video carrier video signals having grey-level signals instead of composite blanking and synchronizing signals, and sync-insertion signals modulated on another carrier, an attachment for a subscriber receiver comprising means for receiving said video carrier and other carrier and for converting them respectively to first and second intermediate-frequency signals, means for demodulating said sync-insertion signals from said second intermediate-frequency signals, a sync-insertion circuit to which said first intermediate frequency is applied, means actuatable for applying said demodulated composite synchronizing signals to said sync-insertion circuit for inserting composite synchronizing signals in said video signals while modulated on said first intermediate-frequency signals, and means for converting said sync-insertion circuit output to a carrier frequency suitable for utilization by a subscriber receiver.

18. In a subscription-television system as recited in claim 17 wherein said means for converting said augmenting circuit output to a video carrier frequency suitable for utilization by a subscriber receiver converts said augmenting circuit output to a carrier frequency other than is received by said attachment.

19. In a subscription-television system of the type wherein there are transmitted modulated on a video carrier video signals having grey-level signals instead of composite blanking and synchronizing signals, and sync-insertion signals and control signals modulated on another carrier, an attachment for a subscriber receiver, comprising means for receiving said video carrier and other carrier and for respectively converting them to first and second intermediate-frequency signals, means for demodulating said sync-insertion signals from said second intermediate-frequency signals, means for demodulating said control signals from said second intermediate-frequency signals, an augmenting circuit to which said first intermediate-frequency signals are applied, an inactive means for applying when rendered active said demodulated sync-insertion signals to said augmenting circuit for inserting synchronizing signals on said video signals while modulated on said first intermediate-frequency signals, and means responsive to said demodulated control signals for rendering said inactive means active.

20. In a subscription-television system of the type wherein there are transmitted first audio signals modulated on a first carrier and second audio signals modulated on a second carrier having a frequency which differs from that of said first carrier, an attachment for a subscriber receiver comprising means for receiving said first and second carriers, a combining circuit having first and second input terminals, means for applying said received first carrier signals from said means for receiving to said combining circuit first input terminals including means for attenuating said received second carrier signals, means for converting the received second carrier signals to the same frequency as that of the received first carrier signals being applied to said first input terminals, first inactive means for applying when rendered active the output of said means for converting to said combining circuit second input terminals, second inactive means for preventing when rendered active said received first carrier signals from interfering with reproduction of said second audio signals, and means for rendering said first and second inactive means active.

21. In a subscription-television system of a type wherein there are transmitted first audio signals frequency-modulated on a first carrier, and second audio signals frequency-modulated on a second carrier which has a different frequency from that of said first carrier, an attachment for a subscriber receiver comprising means for receiving said first and second carriers and for respectively converting them to first and second intermediate frequencies, an adder circuit having first and second input terminals, means for applying said first intermediate frequency to said first input terminal, frequency-translating means for translating the frequency of said second intermediate frequency to that of said first intermediate frequency, inoperative means for applying when rendered operative the output of said frequency-translating means to said adder circuit second input terminals, first means connected to said adder circuit first input terminals for attenuating said second intermediate frequency, second means for attenuating said first intermediate frequency sufficiently to prevent interference with the reproduction of said second audio signals, second inoperative means for connecting when rendered operative said second means for attenuating to said adder circuit second input terminals, and means for rendering said first and second inoperative means operative.

22. In a subscription-television system of the type wherein there is transmitted to a subscribed receiver a video signal modulated on a carrier and an audio signal modulated on a carrier which is at a different location relative to the video carrier than said subscriber receiver can utilize, an attachment for a subscriber receiver comprising means for receiving said video and audio carriers, an inactive means for changing when rendered active the frequency of said audio carrier to a location which said subscriber receiver can utilize, and means for rendering said inactive means active.

23. In a subscription-television system of the type wherein there are transmitted to a subscriber receiver modulated on a video carrier, video signals having grey-level signals in place of composite blanking and synchronizing signals, sync-insertion signals amplitude-modulated on an audio carrier, and audio signals modulated on said audio carrier, said audio carrier having a frequency which is located differently relative to the video carrier than said subscribed receiver can utilize, an attachment for a subscriber receiver comprising means for receiving said video and audio carriers, means for demodulating said sync-insertion signals from said audio carrier, an inactive means for reinserting when rendered active composite sync signals in said video signals responsive to said demodulated sync signals, means for transferring the frequency of said audio carrier to a frequency which said subscriber receiver can utilize, an inactive means for combining when rendered active said transferred audio carrier frequency with said video carrier, and means for rendering active said inactive means for inserting sync and means for combining.

24. In a subscription-television system of a type wherein there are transmitted, modulated on a video carrier, video signals having grey-level signals in place of composite blanking and synchronizing signals, sync-insertion signals amplitude-modulated on a first carrier, first audio signals frequency-modulated on said first carrier, and second audio signals frequency-modulated on a second carrier, an attachment for a subscriber receiver comprising means for receiving said video carrier and first and second carriers, an augmenting circuit to which output from said means for receiving is applied, an adder circuit having a first and second input circuit and an output circuit, means for applying said augmenting circuit output to said adder circuit first input circuit, means for deriving said sync-insertion signals from the output of said means for receiving, first inoperative means for applying when rendered operative said derived sync-insertion signals to said augmenting circuit for inserting composite synchronizing signals in said video signals, means connected to the output of said means for receiving to prevent said second audio signals from interfering with reproduction of said video signals, translating means for converting the frequency of the carrier output of the second audio signals received from said means for receiving to the same carrier frequency as that for said first audio signals being applied to said adder circuit first input terminals, second inoperative means for applying when rendered operative said translating means output to said adder circuit second input, attenuating means for preventing said first audio signals from interfering with reproduction of said second audio signals, third inoperative means for connecting when rendered operative said attenuating means to said augmenting circuit output, and means for rendering said first, second, and third inoperative means operative.

25. In a subscription-television system of a type wherein there are transmitted, modulated on a video carrier, video signals having grey-level signals in place of composite blanking and synchronizing signals, sync-insertion signals amplitude-modulated on a first carrier, first audio signals frequency-modulated on said first carrier, and second audio signals frequency-modulated on a second carrier, an attachment for a subscriber receiver comprising means for receiving said video carrier and first and second carriers and respectively converting them to first, second, and third intermediate frequencies, an augmenting circuit to which output from said means for receiving is applied, an adder circuit and an output circuit, means for applying said augmenting circuit output to said adder circuit first input circuit, means to which said second intermediate frequency is applied for demodulating said sync-insertion signals, first inoperative means for applying when rendered operative said demodulated sync-insertion signals to said augmenting circuit for inserting composite synchronizing signals in said video signals while modulated on said first intermediate frequency, first means for attenuating said third intermediate frequency sufficently to prevent said second audio signals from interfering with the reproduction of said video signals, means connecting said first means for attenuating to said augmenting circuit input, translating means to which said third intermediate frequency is applied for translating its frequency to that of said second intermediate frequency, second inoperative means for applying when rendered operative the output of said translating means to said adding circuit second input circuit, second means for attenuating said second intermediate frequency sufficiently to prevent said first audio signal from interfering with the reproduction of second audio signals, third inoperative means for when rendered operative connecting said second means for attenuating to said adding circuit first input circuit, means for rendering said first, second, and third inoperative means operative, and means for translating the output of said adder circuit to carrier frequencies different than the carrier frequency received at said means for receiving.

26. In a subscription-television system of a type wherein there are transmitted, modulated on a video carrier, video signals having grey-level signals in place of composite blanking and synchronizing signals, composite synchronizing signals amplitude-modulated on a first carrier, first audio signals frequency-modulated on said first carrier, control signals modulated on a control subcarrier which is also amplitude-modulated on said first carrier, and second audio signals frequency-modulated on a second carrier, an attachment for a subscriber receiver comprising means for receiving said video carrier and first and second carriers and respectively converting them to first, second, and third intermediate frequencies, an augmenting circuit to which output from said means for receiving is applied, an adder circuit and an output circuit, means for applying said augmenting circuit output to said adder circuit first input circuit, means to which said second intermediate frequency is applied for demodulating said composite synchronizing signals, first inopeartive means for applying when rendered operative said demodulated composite synchronizing signals to said augmenting circuit for inserting composite synchronizing signals in said video signals while modulated on said first intermediate frequency, first means for attenuating said third intermediate frequency sufficiently to prevent said second audio signals from interfering with the reproduction of said video signals, means connecting said first means for attenuating to said augmenting circuit input, translating means to which said third intermediate frequency is applied for translating its frequency to that of said second intermediate frequency, second inoperative means for applying when rendered operative the output of said translating means to said adding circuit second input circuit, second means for attenuating said second intermediate frequency sufficiently to prevent said first audio signal from interfering with the reproduction of second audio signals, third inoperative means for when rendered operative connecting said second means for attenuating to said adding circuit first input circuit, means for demodulating said control subcarrier signals from said first carrier, means for demodulating said control signals from said demodulated subcarrier signals, means operable for rendering said first, second and third inoperative means operative responsive to said control signals, and means for translating the output frequency of said adder circuit to carrier frequencies different from the carrier frequencies received.

27. In a television-secrecy system wherein at a transmitter video signals with grey-level signals in place of composite synchronizing and blanking signals are generated by suppressing said composite synchronizing and blanking signals and at a receiver synchronizing signals are restored by augmenting the grey-level video signals, the improvement comprising generating composite synchronizing signals at said transmitter, transmitting said composite synchronizing signals to said receiver, augmenting said grey-level video signals at said receiver with said composite synchronizing signals to insert composite synchronizing signals in said video signals.

28. A televsion-secrecy system comprising at a transmitter means for generating composite video signals having horizontal and vertical sychronizing signals and associated horizontal and vertical blanking signals, means for separating said horizontal and vertical blanking signals from said composite video, means for separating said composite synchronizing signals from said composite video signals, means for suppressing said horizontal and vertical synchronizing signals and associated blanking signals in said composite video signals to a grey-level responsive to said composite blanking signals, means for separately transmitting said video signals with said grey-level signals and said composite synchronizing signals, means for receiving said video signals with grey-level signals and said composite synchronizing signals, and means for inserting synchronizing signals in said received grey-level video signals responsive to said composite synchronizing signals.

References Cited by the Examiner

UNITED STATES PATENTS

| | | | |
|---|---|---|---|
| 2,510,046 | 5/50 | Ellett | 178—5.1 |
| 2,567,539 | 9/51 | Aram | 178—5.6 |
| 2,705,740 | 4/55 | Druz | 178—5.1 |
| 2,854,506 | 9/58 | Pickles | 178—5.1 |
| 2,907,816 | 10/59 | Weiss | 178—5.1 |

DAVID G. REDINBAUGH, *Primary Examiner.*

NEWTON LOVEWELL, *Examiner.*